US009035971B2

(12) United States Patent
Aoki

(10) Patent No.: US 9,035,971 B2
(45) Date of Patent: May 19, 2015

(54) IMAGE DISPLAY APPARATUS, IMAGE DISPLAY METHOD, AND OF IMAGE DISPLAY PROGRAM

(71) Applicant: Satoshi Aoki, Kanagawa (JP)

(72) Inventor: Satoshi Aoki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 301 days.

(21) Appl. No.: 13/750,009

(22) Filed: Jan. 25, 2013

(65) Prior Publication Data
US 2013/0207998 A1    Aug. 15, 2013

(30) Foreign Application Priority Data

Feb. 9, 2012  (JP) ................... 2012-026157

(51) Int. Cl.
G09G 5/00 (2006.01)
G06K 9/00 (2006.01)
(Continued)

(52) U.S. Cl.
CPC .............. G09G 5/00 (2013.01); G06F 3/1454 (2013.01); G06F 3/00 (2013.01); G09G 3/001 (2013.01); G09G 5/14 (2013.01); G09G 2330/022 (2013.01); G09G 2340/12 (2013.01);
(Continued)

(58) Field of Classification Search
USPC .......... 345/619, 629–641; 382/103, 107, 181, 382/284; 434/365, 428, 430; 710/36, 48, 710/260–269; 715/700, 718, 730–735, 741, 715/743, 750, 751, 753, 755, 759, 764, 765, 715/767, 781, 802–805, 863; 709/201–211, 709/227, 228, 237; 726/2, 27–29; 725/109; 353/121
See application file for complete search history.

(56) References Cited

U.S. PATENT DOCUMENTS 7,251,675 B1 * 7/2007 Kamakura et al. ............ 709/204
8,327,418 B2 * 12/2012 Lee et al. ..................... 726/2
(Continued)

FOREIGN PATENT DOCUMENTS

JP   2006-085387   3/2006
JP   2006-092365   4/2006
JP   2009-180943   8/2009

OTHER PUBLICATIONS

Licsár, Attila, and Tamás Szirányi. "Hand Gesture Recognition in Camera-Projector System*." Computer Vision in Human-Computer Interaction. Springer Berlin Heidelberg, 2004. pp. 83-93.*

Primary Examiner — Wesner Sajous
Assistant Examiner — Andrew Shin
(74) Attorney, Agent, or Firm — Harness, Dickey & Pierce, P.L.C.

(57) ABSTRACT

An image display apparatus includes a communication unit to communicate with information processing apparatuses; an image synthesizing unit to synthesize a multi-segmented screen image composed of screen images of the information processing apparatuses; a projection unit to project the multi-segmented screen image onto a screen; a functional mode management unit to control switching between a normal projection mode and a multi-segmented screen operation mode; an image capture device to capture the multi-segmented screen image and a hand movement of an operator when switched to the multi-segmented screen operation mode; a designated screen image recognition unit to detect a hand movement of the operator based on the image captured by the image capture device, and to recognize a screen image designated as an active-target image; and a signal control unit to transmit a request of image data transmission to an information processing apparatus corresponding to the designated active-target image.

20 Claims, 9 Drawing Sheets

(51) Int. Cl.
<table>
<tr><td>G06K 9/36</td><td>(2006.01)</td></tr>
<tr><td>G09B 25/00</td><td>(2006.01)</td></tr>
<tr><td>G09B 29/00</td><td>(2006.01)</td></tr>
<tr><td>G06F 3/00</td><td>(2006.01)</td></tr>
<tr><td>G06F 13/24</td><td>(2006.01)</td></tr>
<tr><td>G06F 3/048</td><td>(2013.01)</td></tr>
<tr><td>G06F 3/033</td><td>(2013.01)</td></tr>
<tr><td>G06F 15/16</td><td>(2006.01)</td></tr>
<tr><td>G03B 21/00</td><td>(2006.01)</td></tr>
<tr><td>G09G 5/14</td><td>(2006.01)</td></tr>
<tr><td>H04N 9/31</td><td>(2006.01)</td></tr>
<tr><td>G06F 3/14</td><td>(2006.01)</td></tr>
<tr><td>G09G 3/00</td><td>(2006.01)</td></tr>
</table>

(52) U.S. Cl.
CPC ........ *G09G2354/00* (2013.01); *G09G 2370/20* (2013.01); *H04N 9/3179* (2013.01); *H04N 9/3194* (2013.01); *G09G 2370/025* (2013.01)

(56) References Cited

U.S. PATENT DOCUMENTS

2004/0267981 A1* 12/2004 Kakemura .................... 710/48
2005/0030255 A1*  2/2005 Chiu et al. .................... 345/1.3
2007/0257927 A1* 11/2007 Sakanishi et al. ............. 345/581
2011/0231791 A1*  9/2011 Itahana ........................ 715/799
2011/0280441 A1* 11/2011 Chen et al. ................... 382/103

* cited by examiner

FIG. 11

| TYPES OF GESTURE | PROCESS CONTENT |
|---|---|
| POINT TARGET IMAGE BY INDEX FINGER FOR ONE SECOND OR MORE | DRAG IMAGE |
| MOVE FINGER UPWARD FOR TARGET IMAGE WHILE DRAGGING IMAGE | MOVE IMAGE UPWARD |
| MOVE FINGER TO LEFT FOR TARGET IMAGE WHILE DRAGGING IMAGE | MOVE IMAGE TO LEFT |
| MOVE FINGER TO RIGHT FOR TARGET IMAGE WHILE DRAGGING IMAGE | MOVE IMAGE TO RIGHT |
| MOVE FINGER DOWNWARD FOR TARGET IMAGE WHILE DRAGGING IMAGE | MOVE IMAGE DOWNWARD |
| PALM OF HAND: FROM ROCK TO PAPER FOR TARGET IMAGE | ENLARGE DISPLAY CONTENT |
| PALM OF HAND: FROM PAPER TO ROCK FOR TARGET IMAGE | REDUCE DISPLAY CONTENT |
| ROTATE FINGER CLOCKWISE FOR TARGET IMAGE WHILE DRAGGING IMAGE | SET SCREEN IMAGE ACTIVE |
| ROTATE FINGER COUNTER-CLOCKWISE FOR TARGET IMAGE WHILE DRAGGING IMAGE | SET SCREEN IMAGE NON-ACTIVE |

FIG. 12

| CONNECTION TERMINAL | SCREEN IMAGE POSITION | ACTIVE | LAYER | IP ADDRESS |
|---|---|---|---|---|
| PC24 | X=0, Y=50, W=150, H=200 | ON | 1 | xxx.xxx.xxx.xxx |
| PC25 | X=0, Y=50, W=150, H=200 | OFF | 2 | yyy.yyy.yyy.yyy |
| PC26 | X=0, Y=50, W=150, H=200 | OFF | 3 | zzz.zzz.zzz.zzz |
| PC27 | X=0, Y=50, W=150, H=200 | OFF | 4 | ccc.ccc.ccc.ccc |

IMAGE DISPLAY APPARATUS, IMAGE DISPLAY METHOD, AND OF IMAGE DISPLAY PROGRAM

CROSS-REFERENCE TO RELATED APPLICATION

This application claims priority to Japanese Patent Application No. 2012-026157, filed on Feb. 9, 2012 in the Japan Patent Office, the disclosure of which is incorporated by reference herein in its entirety.

BACKGROUND

1. Technical Field

The present invention relates to an image display apparatus that projects and displays an image on a screen.

2. Description of the Background Art

Image display apparatuses such as projectors can project images on a projection screen for displaying the images. Such image display apparatuses have one or more connection terminals (e.g., VGA terminal) to which one or more information processing apparatuses such as personal computers (PCs) can be connected using cables. The connected information processing apparatuses transmit image data displayed on a display of the information processing apparatuses to the image display apparatus, and the image display apparatus projects such image data transmitted from the information processing apparatuses on the screen.

Such image display apparatus needs to conduct a given process when changing a projection image from one screen image of a first information processing apparatus, currently connected to the image display apparatus, to another screen image of a second information processing apparatus. For example, when projecting another screen image of the second information processing apparatus, the first information processing apparatus may be required to be disconnected at first, and then the second information processing apparatus is connected, which is not a convenient process for a user.

In view of such issues, JP-2009-180943-A discloses an image display apparatus such as a projector equipped with a plurality of input terminals connectable with a plurality of personal computers (PCs), in which the projector can display a screen image of each PC on a projection screen based on the image signals received via the input terminals. For example, when image signals are input at only one input terminal, the size of projection image of the input image signals is set to a full-screen size, and when image signals are input at the plurality of input terminals, the size of each projection image corresponding to each of input image signals is set to a ratio-based size based on the input image signals.

Such projector requires the input terminals corresponding to the numbers of PCs to display the screen image of each PC on the screen. Therefore, as the numbers of screen images of PCs to be displayed on the screen increase, the hardware size of connection circuit in the image display apparatus used for a plurality of PCs becomes large and complex.

With the development of wireless local area network (LAN), the image display apparatus can be equipped with a wireless communication function, with which the image display apparatus can communicate data with a plurality of information processing apparatuses simultaneously.

With employing the wireless communication function, the image display apparatus can communicate with a plurality of PCs simultaneously without using a plurality of input terminals, by which a hardware size of the connection circuit in the image display apparatus used for the plurality of PCs may not become too large.

However, each of the PCs cannot determine which PC corresponds to a target PC for the image display apparatus. Therefore, each PC may need to transmit image signals of screen images to the image display apparatus constantly. Therefore, as the numbers of connected PCs increase, data size received by the image display apparatus becomes too great, by which communication processing load of the image display apparatus increases.

JP-2006-92365-A discloses an image display apparatus to cope with such increased processing load. The image display apparatus connected to a plurality of terminal apparatuses receives a connection request from one of the terminal apparatuses, and displays a screen image of the terminal apparatus that has issued the connection request. Among the plurality of terminal apparatuses, a terminal apparatus that has issued the connection request at first can be set as a master terminal apparatus, and each of other terminal apparatuses is set as a non-master or slave terminal apparatus.

When the image display apparatus is under the operation based on a connection request from the non-master terminal apparatus, the master terminal apparatus can issue a connection request to the image display apparatus. Then, the image display apparatus restricts the connection request from the non-master terminal apparatus.

As such, conventional image display apparatus restricts the connection request from the non-master terminal apparatus once the image display apparatus is operated with the master terminal apparatus such as an information processing apparatus, which is the apparatus connected to the image display apparatus at first. In such a configuration, communications between the image display apparatus and the plurality of information processing apparatuses cannot be switched between active and non-active status from the image display apparatus so easily.

SUMMARY

In one aspect of the present invention, an image display apparatus is devised. The image display apparatus includes a communication unit, using a processing device, to communicate with a plurality of information processing apparatuses; an image synthesizing unit, using the processing device, to synthesize a multi-segmented screen image data composed of screen images of the plurality of information processing apparatuses based on image data received from each of the plurality of information processing apparatuses through the communication unit; a projection unit to project the multi-segmented screen image data synthesized by the image synthesizing unit onto a screen; a functional mode management unit, using the processing device, to control switching between a normal projection mode and a multi-segmented screen operation mode, wherein the functional mode management unit receives an interrupt request from each of the information processing apparatuses when switched to the normal projection mode; an image capture device to capture the multi-segmented screen image displayed on the screen and an image of hand movement of an operator with respect to the multi-segmented screen image when the functional mode management unit switches to the multi-segmented screen operation mode; a designated screen image recognition unit, using the processing device, to detect a hand movement of the operator with respect to the multi-segmented screen image based on the multi-segmented screen image and the image of hand movement of the operator captured by the image capture device, and to recognize a screen image designated as an active-target image in the multi-segmented screen image based on the detected hand movement; and a signal control unit, using the processing device, to transmit a request of image data transmission to an information processing apparatus corresponding to a screen image designated as an active-target image by the designated screen image recognition unit, and not to receive an interrupt request from an information processing apparatus corresponding to a screen image of a non active-target image.

In another aspect of the present invention, a method of managing image display for an image display apparatus is devised. The method includes the steps of communicating with a plurality of information processing apparatuses; synthesizing a multi-segmented screen image data composed of screen images of the plurality of information processing apparatuses based on image data received from each of the plurality of information processing apparatuses through the communication unit; projecting the multi-segmented screen image data synthesized by the image synthesizing unit as a multi-segmented screen image onto a screen; controlling a switching between a normal projection mode and a multi-segmented screen operation mode, wherein an interrupt request from each of the information processing apparatuses is received by the image display apparatus when switched to the normal projection mode; capturing the multi-segmented screen image displayed on the screen and an image of hand movement of an operator with respect to the multi-segmented screen image when the functional mode management unit switches to the multi-segmented screen operation mode; detecting a hand movement of the operator with respect to the multi-segmented screen image based on the multi-segmented screen image and the image of hand movement of the operator captured by the capturing, and recognizing a screen image designated as an active-target image in the multi-segmented screen image based on the detected hand movement; and transmitting a request of image data transmission to an information processing apparatus corresponding to the screen image designated as the active-target image by the designated screen image recognition unit, and not receiving an interrupt request from an information processing apparatus corresponding to a screen image of a non active-target image.

In another aspect of the present invention, a non-transitory computer-readable storage medium storing a program that, when executed by a computer, causes the computer to execute a method of managing image display for an image display apparatus is devised. The method includes the steps of communicating with a plurality of information processing apparatuses; synthesizing a multi-segmented screen image data composed of screen images of the plurality of information processing apparatuses based on image data received from each of the plurality of information processing apparatuses through the communication unit; projecting the multi-segmented screen image data synthesized by the image synthesizing unit as a multi-segmented screen image onto a screen; controlling a switching between a normal projection mode and a multi-segmented screen operation mode, wherein an interrupt request from each of the information processing apparatuses is received by the image display apparatus when switched to the normal projection mode; capturing the multi-segmented screen image displayed on the screen and an image of hand movement of an operator with respect to the multi-segmented screen image when the functional mode management unit switches to the multi-segmented screen operation mode; detecting a hand movement of the operator with respect to the multi-segmented screen image based on the multi-segmented screen image and the image of hand movement of the operator captured by the capturing, and recognizing a screen image designated as an active-target image in the multi-segmented screen image based on the detected hand movement; and transmitting a request of image data transmission to an information processing apparatus corresponding to the screen image designated as the active-target image by the designated screen image recognition unit, and not receiving an interrupt request from an information processing apparatus corresponding to a screen image of a non active-target image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 11 shows an example of a gesture/operation table stored in the gesture database of FIG. 6;

FIG. 12 shows an example of display screen image information for the multi-segmented screen image managed by a display image information management unit of FIG. 6.

Figure 1:
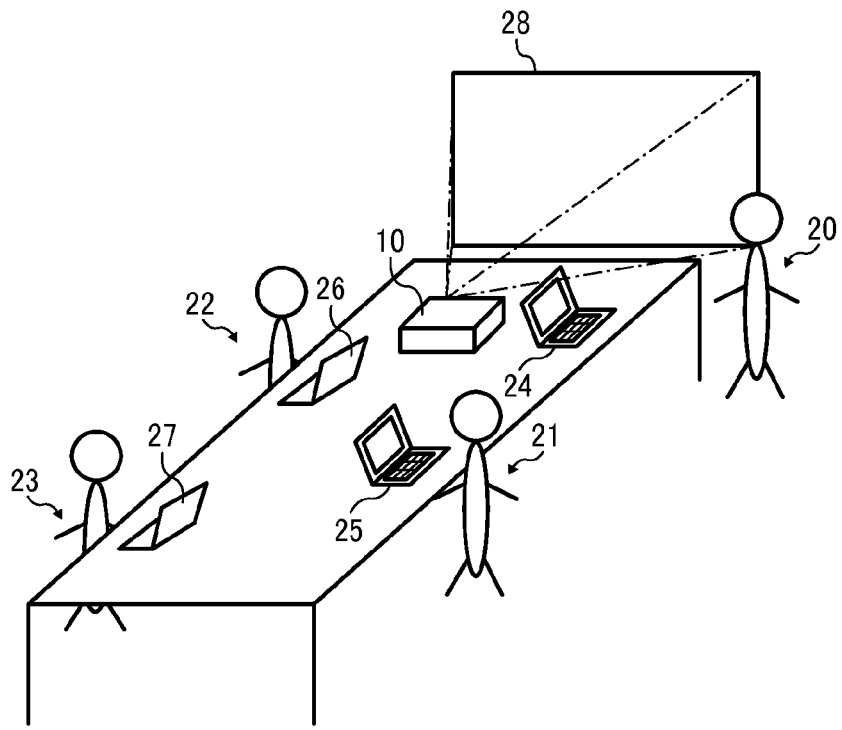
FIG. 1 shows an example configuration of an image display system including an image display apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

FIG. 1 shows a configuration of an image display system using an image display apparatus according to an example embodiment. The image display system may include, for example, an image display apparatus 10, a personal computer (PC) 24 used by a user (operator) 20, a PC 25 used by a user 21, a PC 26 used by a user 22, and a PC 27 used by a user 23. The image display apparatus 10 can project images transmitted from each of the PCs 24-27 on a screen 28.

Each of the PCs 24-27 is an information processing apparatus such as a notebook computer, a mobile PC, or the like. The image display apparatus 10 may be a projector that can project images (e.g., screen images) transmitted from each of the PCs 24-27 onto the screen 28. The PCs 24-27 and the image display apparatus 10 can be connected with each other by wireless communication such as wireless local area network (LAN) for enabling data communication. FIG. 1 shows a meeting scene that the users 20 to 23 participate.

The image display apparatus 10 and the PCs 24-27 can be connected with each other by the wireless LAN for enabling simultaneous data communication, but the image display apparatus 10 and the PCs 24-27 can be connected with each other using other simultaneous connection system. Further, the PC 24 of the user 20 (i.e., speaker in FIG. 1) can be wired to the image display apparatus 10 via a video graphics array (VGA) terminal. The VGA is a known standard of graphics system, and thereby the explanation of VGA is omitted.

In the following description, in a meeting participated by the users 20 to 23, the image display apparatus 10 and the PCs 24-27 are used, in which the user 20 may be a speaker, and the user 21 to 23 are audiences. The image display apparatus 10 and the PCs 24-27 can be interactively used in such situation by the operations of the users 20-23. In the meeting, a speaker and audiences can be changed, as required.

A description is given of outer appearance of the image display apparatus 10 with reference to FIG. 2, which shows a perspective view of the image display apparatus 10 of FIG. 1.

Figure 2A:
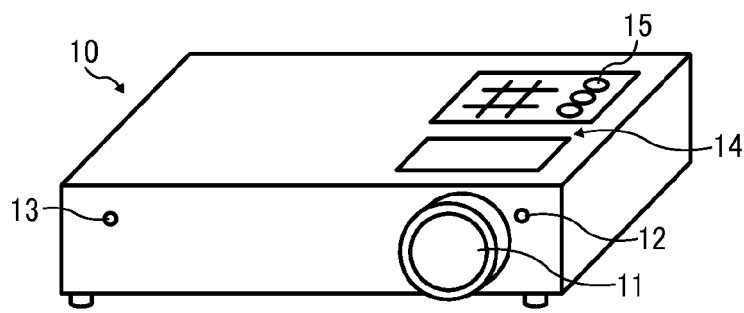
FIG. 2A shows a perspective view of the image display apparatus of FIG. 1 viewed from the front side.
Figure 2B:
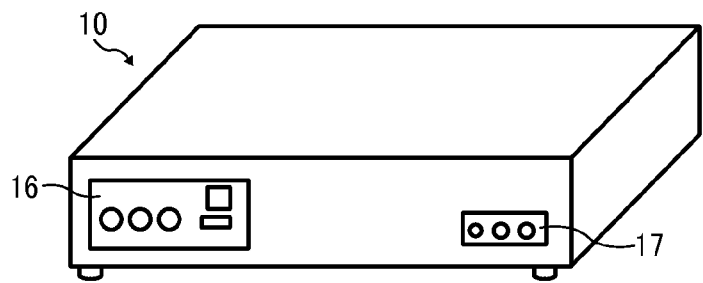
FIG. 2B shows a perspective view of the image display apparatus of FIG. 1 viewed from the rear side.

FIG. 2A shows a perspective view of the image display apparatus 10 viewed from the front side, and FIG. 2B shows a perspective view of the image display apparatus 10 viewed from the rear side. As shown in FIG. 2A, the image display apparatus 10 includes a projection lens 11, and an image capture device 12 at the front side of a housing of the image display apparatus 10. The image display apparatus 10 further includes a lamp unit 13, an operation unit 14, a power button 15, an interface 16, and a connection terminal unit 17.

The image display apparatus 10 includes a light modulator in the housing. The light modulator modulates light emitted from a light source to imaging light, and then the imaging light is projected to the screen 28 through the projection lens 11 as an enlarged image. The image display apparatus 10 can employ known projection systems, for example, a liquid crystal system, a digital light processing (DLP: registered trademark) system, and thereby the explanation of such projection systems is omitted. The image capture device 12 is, for example, a camera that can capture images of multi-segmented screen image projected on the screen 28 and images of gesture of the user 20. The captured image may be still or moving images.

The multi-segmented screen image is an image projected on the screen 28, which is generated by synthesizing a plurality of display images of the PCs 24-27. The gesture means, for example, a hand movement of the user 20 with respect to the multi-segmented screen image projected on the screen 28, wherein the hand movement of the user 20 is, for example, a movement of a right and/or left hands of the user 20. The lamp unit 13 can report or notify the user 20 whether the image display apparatus 10 is at a normal projection mode or a multi-segmented screen operation mode by changing emitting color of light and/or emitting condition of light.

In the normal projection mode, the image display apparatus 10 can project one screen image on the screen 28 using an image displayed on a screen of one of the PCs 24-27 based on a request from each of the PCs 24-27.

Further, in the multi-segmented screen operation mode, the image display apparatus 10 can project a multi-segmented screen image generated by synthesizing a plurality of images displayed on the PCs 24-27 on the screen 28, and such projected multi-segmented screen image can be operable by a gesture of the user 20.

Further, the image display apparatus 10 includes the operation unit 14 on a top face of the housing, wherein the user 20 can use the operation unit 14 to operate the image display apparatus 10 manually.

The operation unit 14 includes various buttons and keys, for example, the power button 15, a menu button, a up/down direction key, a left/right direction key, and an enter key, but not limited these. The user 20 operates the power button 15 as a switch to control power-supply ON/OFF for the image display apparatus 10. The user 20 operates the operation unit 14 for conducting various operations. Such operations include, for example, an adjustment of luminance, chroma, focus of imaging light projected onto the screen 28, switching of modes among the normal projection mode, the multi-segmented screen operation mode, and the energy-save mode, slide-show mode of images projected on the screen 28, and setting network conditions, or the like.

Further, as shown in FIG. 2B, the image display apparatus 10 includes, for example, the interface 16 on a rear face of the housing, to which an external apparatus can be connected. For example, external apparatuses such as PCs 24-27 (FIG. 1), a digital versatile disk (DVD) player, a digital camera, and a video game player used as image data source apparatus can be connected to the image display apparatus 10 via the interface 16.

The interface 16 can be various interfaces such as for example, serial communication interface (UART), high-definition multimedia interface (HDMI) terminal, the VGA terminal, D4 terminal, component terminal, composite terminal, S-image terminal, audio terminal, and wireless LAN interface, but not limited thereto. Further, the image display apparatus 10 includes the connection terminal unit 17 on the rear face of the housing to which a speaker, an earphone, and a headphone can be connected.

Figure 3:
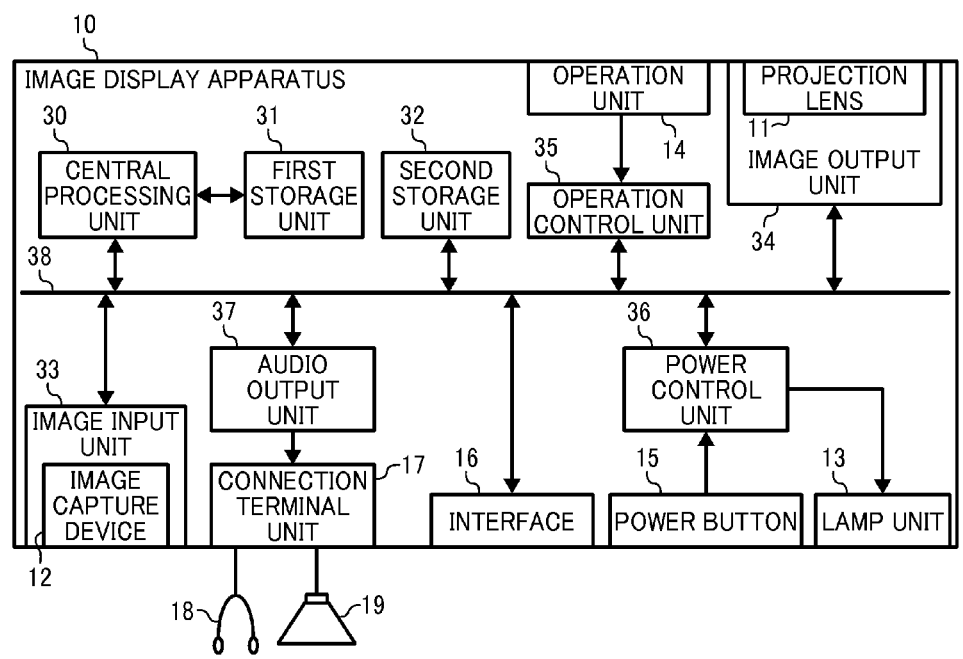
FIG. 3 shows an overall hardware configuration of the image display apparatus of FIGS. 2A and 2B.

A description is given of an overall hardware configuration of the image display apparatus 10 with reference to FIG. 3, which shows an overall hardware configuration of the image display apparatus 10 shown in FIG. 2. As above described, the image display apparatus 10 includes, for example, the projection lens 11, the image capture device 12, the lamp unit 13, the operation unit 14, the power button 15, the interface 16, and the connection terminal unit 17.

Further, the image display apparatus 10 includes, for example, a central processing unit (CPU) 30, a first storage unit 31, a second storage unit 32, an image input unit 33, an image output unit 34, an operation control unit 35, a power control unit 36, and an audio output unit 37, which are connectable with other via a bus 38 so that data can be exchanged among the units.

The CPU 30 is a central processing unit (CPU), used as a computing unit of the image display apparatus 10. The CPU 30 controls the image display apparatus 10 as a whole, and conducts various control processes such as management of functional modes, gesture recognition, generation of control signals, management of display screen image information, image synthesizing, communication, and function setting according to an example embodiment.

The first storage unit 31 is, for example, a semiconductor memory such as a random access memory (RAM) to which the CPU 30 can read and write directly, and can be used as a storage area that temporarily stores computed results, used by the CPU 30 for conducting various processing.

The second storage unit 32 is, for example, a re-writable non-volatile semiconductor memory such as a flash memory, and stores control programs executable by the CPU 30, and various parameters such as information of settings of functions installed in the image display apparatus 10, adjustment data for audio volume for projection, colors, and light intensity.

Further, the second storage unit 32 may store information of gesture/operation table, which stores types of hand movement of the user 20 and specific operation contents to be conducted on a designated screen by correlating such movement information and specific operation contents.

The image input unit 33 includes, for example, an image capture device 12 and a specific circuit such as a digital signal processor (DSP). The image capture device 12 can capture a multi-segmented screen image projected on the screen 28 (FIG. 1), and an image of hand movement of the user 20 with respect to the multi-segmented screen image when the multi-segmented screen operation mode is set.

The specific circuit such as DSP conducts various processing for images captured by the image capture device 12 to be used as image data for gesture-recognition, in which filtering process is conducted to correct captured image data, and distortion correction process is conducted to correct image distortion. The image input unit 33 outputs image data, captured by the image capture device 12 and then corrected by the filtering process and distortion correction process, to the CPU 30.

Such corrected image data is transferred and stored to the second storage unit 32 via the CPU 30. Then, the CPU 30 conducts processes such as gesture recognition, and generation of control signals to the image data stored in the second storage unit 32. When a mode of the image display apparatus 10 is switched to the multi-segmented screen operation mode, the image capture device 12 can capture a multi-segmented screen image projected on the screen 28 and an image of hand movement of the user 20 with respect to the multi-segmented screen image.

The image output unit 34 includes, for example, the projection lens 11, and a circuit to project an image on the screen 28 using imaging light projected through the projection lens 11. The image output unit 34 includes a function of projection unit that projects a multi-segmented screen image on the screen 28 based on multi-segmented screen image data, and images corresponding to types of hand movement of the user 20 on the screen 28. The detail of the image output unit 34 will be described later with reference to FIG. 5.

The operation control unit 35 receives key operation information or key event input by the operation unit 14, and outputs control signals based on such operation information to the CPU 30. Based on the control signal of operation information, input from the operation control unit 35, the CPU 30 conducts a mode switching, various types of settings process, or the like. The key event may include scrolling in up/down/left/right, entering event, menu display event, or the like.

The power control unit 36 is a circuit for controlling power supply to the image display apparatus 10. When the power button 15 is set ON, the power control unit 36 starts power-supply to the entire image display apparatus 10, and when the power button 15 is set OFF, the power control unit 36 stops power-supply to the entire image display apparatus 10. Further, when it is detected that no operation is conducted to the image display apparatus 10 for a given time period after setting power ON using the power button 15, the power control unit 36 automatically shifts a mode to an energy-save mode to stop power-supply partially to the image display apparatus 10.

Further, when the hand movement of the user 20 is not detected for a given time period, the power control unit 36 shifts a mode to an energy-save mode to reduce power consumption. As such, the power control unit 36 can be used as a power-save shift unit. Further, when the image display apparatus 10 is switched to the normal projection mode, the power control unit 36 stops power-supply to the image input unit 33. As such, the power control unit 36 can be used as a power-supply stop unit.

The audio output unit 37 is a circuit for outputting audio guidance of operation sequence of the image display apparatus 10 for the user 20, and outputting audio corresponding to playing movie image for the users 20 to 23 participating a meeting. The audio output unit 37 outputs audio data to a headphone 18 or a speaker 19 connected to a connection terminal unit 17 based on control signals received from the CPU 30.

The lamp unit 13 is used as an indicator lamp for indicating the normal projection mode and multi-segmented screen operation mode of the image display apparatus 10 to the user 20. Specifically, different color lights can be emitted for the normal projection mode and the multi-segmented screen operation mode for recognizing a current mode easily. Further, the indicator lamp can be kept ON for the normal projection mode, and the indicator lamp can be kept flashing such as ON/OFF switching for the multi-segmented screen operation mode. Such recognition of modes between the normal projection mode and the multi-segmented screen operation mode can be conducted using other display apparatus and methods.

As such, the lamp unit 13 can function as a notification unit to report a mode switching status between the normal projection mode and the multi-segmented screen operation mode of the image display apparatus 10. As such, based on the light display types of the lamp unit 13, the user 20 can easily recognize whether the image display apparatus 10 is at the normal projection mode or multi-segmented screen operation mode, by which user-convenience or user-friendliness for the user 20 can be enhanced.

Figure 4:
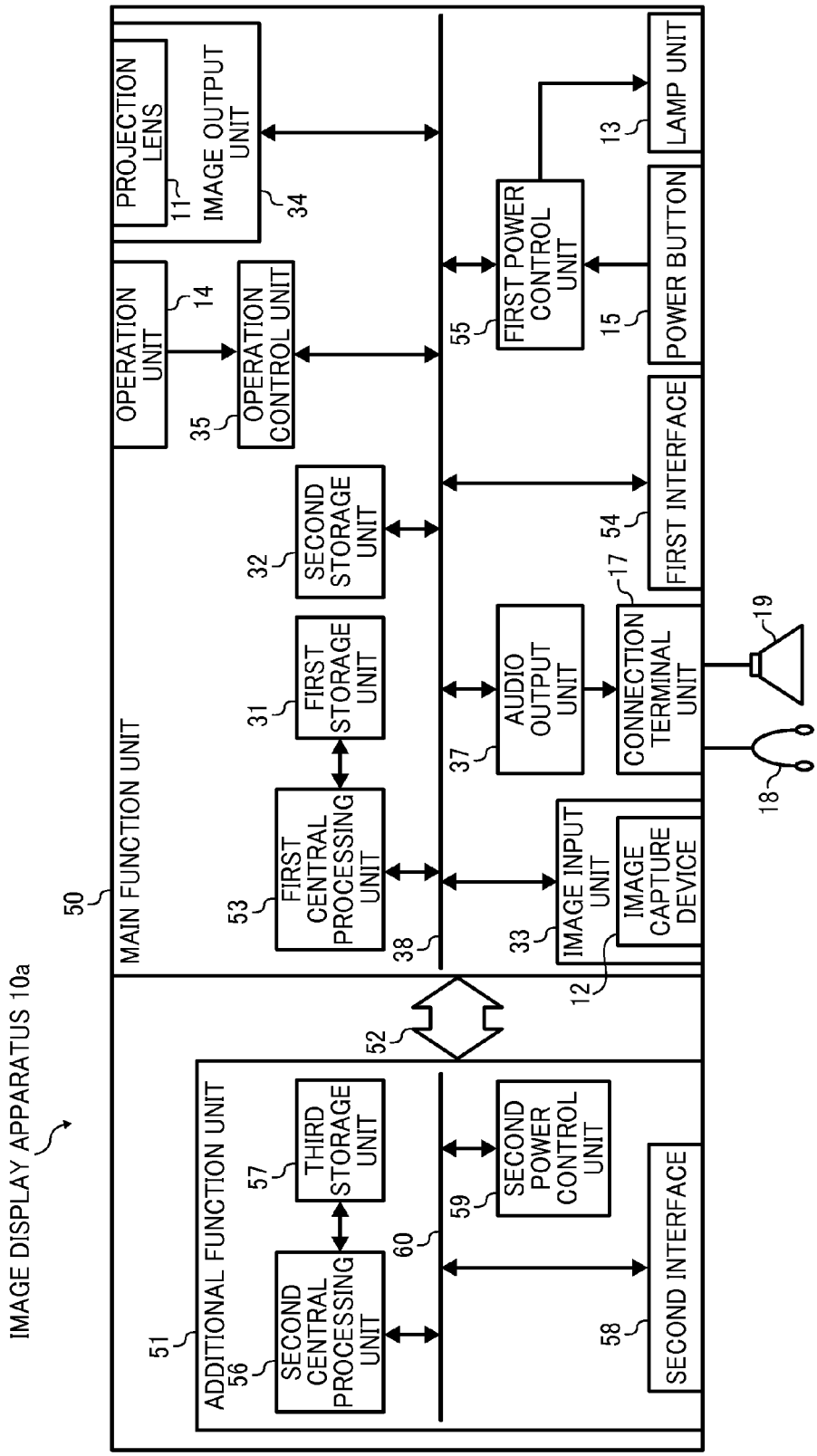
FIG. 4 shows another overall hardware configuration of the image display apparatus of FIGS. 2A and 2B.

A description is given of another example of an overall hardware configuration of the image display apparatus with reference to FIG. 4, which shows an overall hardware configuration of an image display apparatus 10*a*. The hardware configuration of the image display apparatus 10*a* includes, for example, two functional units such as a main function unit 50 and an additional function unit 51 as shown in FIG. 4.

The main function unit 50 functions as a general image display apparatus, and the additional function unit 51 conducts various control processes according to an example embodiment such as management of functional modes, gesture recognition, generation of control signals, management of display screen image information, image synthesizing, communication, and function setting. The main function unit 50 and the additional function unit 51 can be connected with each other via a bus 52 for data communication. By separately providing functional units as such, different functions of the image display apparatus can be allocated to different hardware devices. With such configuration, without changing a configuration of general image display apparatus, functions according to an example embodiment can be added easily.

The main function unit 50 may mainly used for projecting images on the screen 28 and managing information of settings for image projection for the image display apparatus 10*a*. The internal configuration of the image display apparatus 10*a* is almost same as the image display apparatus 10 shown in FIG. 3, but some functions are different. The same units used in the image display apparatus 10 of FIG. 3 and in the image display apparatus 10*a* of FIG. 4 have the same references and the explanation of such units is omitted.

The main function unit 50 includes a first central processing unit 53, which is a CPU used as a computing unit of the image display apparatus 10*a*. The first central processing unit 53 controls the image display apparatus 10*a* as a whole.

The main function unit 50 includes a first interface 54 including an interface for image data input such as serial communication interface (UART), high-definition multimedia interface (HDMI) terminal, VGA terminal, D4 terminal, component terminal, composite terminal, and S-image terminal, and an interface for audio terminal. The first interface 54 and a second interface 58 of the additional function unit 51 may correspond to the interface 16 shown in FIG. 3.

The main function unit 50 includes a first power control unit 55. The first power control unit 55 is a circuit for controlling power supply to the image display apparatus 10*a*. When the power button 15 is set ON, the first power control unit 55 starts power-supply to the entire image display apparatus 10*a*, and when the power button 15 is set OFF, the first power control unit 55 stops power-supply to the entire image display apparatus 10*a*. Further, when it is detected that no operation is conducted to the image display apparatus 10*a* for a given time period after setting power ON using the power button 15, the first power control unit 55 automatically shifts a mode to an energy-save mode to stop power-supply partially to the image display apparatus 10*a*.

Further, when the hand movement of the user 20 is not detected for a given time period, the first power control unit 55 shifts a mode to an energy-save mode to reduce power consumption under an instruction from a second power control unit 59 of the additional function unit 51. As such, the first power control unit 55 and the second power control unit 59 can be collectively used as a power-save shift unit.

Further, when the image display apparatus 10*a* is switched to the normal projection mode based on an instruction from the second power control unit 59, the first power control unit 55 stops power-supply to the image input unit 33. As such, the first power control unit 55 and the second power control unit 59 can be collectively used as a power-supply stop unit.

Further, the additional function unit 51 is mainly used for adding functions not included in the main function unit 50. The additional function unit 51 includes, for example, a second central processing unit 56, a third storage unit 57, a second interface 58, and the second power control unit 59, which are connectable with each other via a bus 60 for data communication.

Similar to the first central processing unit 53, the second central processing unit 56 is a CPU used for computing process, and mainly controls the additional function unit 51. The second central processing unit 56 conducts various control processes such as management of functional modes, gesture recognition, generation of control signals, management of display screen image information, image synthesizing, communication, and function setting according to an example embodiment.

The third storage unit 57 is, for example, a semiconductor memory such as a random access memory (RAM) to which the second central processing unit 56 can read and write directly, and can be used as a storage area that temporarily stores computed results, used by the second central processing unit 56 for conducting various processing.

The second interface 58 includes various interfaces such as serial communication interface (UART), universal serial bus (USB), wired LAN interface, and wireless LAN interface for connecting with the PCs 24-27 shown in FIG. 1.

The second power control unit 59 is a circuit for controlling power supply to each unit in the additional function unit 51. When the hand movement of the user 20 is not detected for a given time period, the second power control unit 59 shifts a mode to an energy-save mode to reduce power consumption. As such, the second power control unit 59 can be used as a power-save shift unit.

Further, when the image display apparatus 10*a* is switched to the normal projection mode, the second power control unit 59 stops power-supply to the image input unit 33. As such, the second power control unit 59 can be used as a power-supply stop unit.

Further, when the hand movement of the user 20 is not detected for a given time period, the second power control unit 59 shifts the additional function unit 51 to the energy-save mode, and instructs the first power control unit 55 to shift the main function unit 50 to the energy-save mode to reduce power consumption of the main function unit 50. As such, the second power control unit 59 and the first power control unit 55 can be collectively used as a power-save shift unit.

Further, when the image display apparatus 10*a* is switched to the normal projection mode, the second power control unit 59 instructs the first power control unit 55 to stop power-supply to the image input unit 33. As such, the second power control unit 59 and the first power control unit 55 can be collectively used as a power-supply stop unit.

Figure 5:
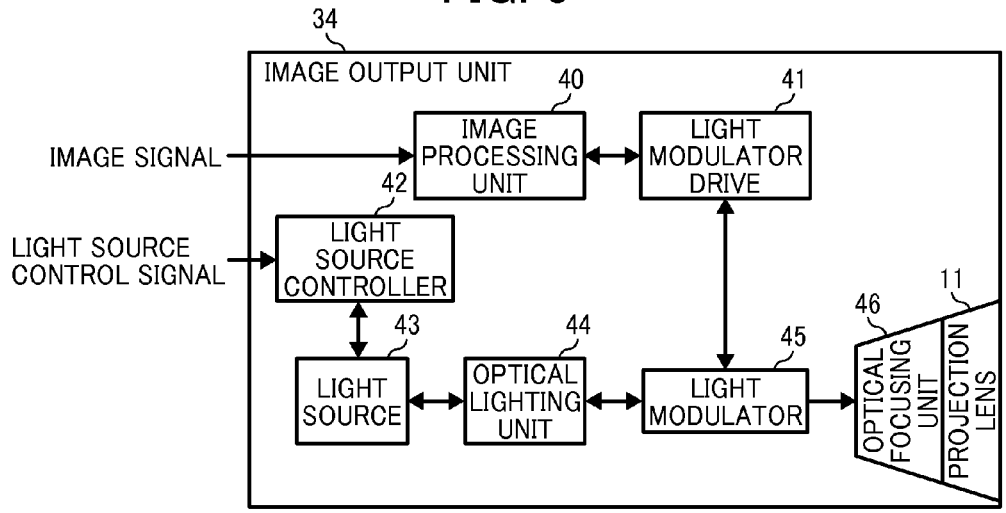
FIG. 5 shows an internal hardware configuration of an image output unit.

A description is given of an internal hardware configuration of the image output unit 34 with reference to FIG. 5, which shows an internal hardware configuration of the image output unit 34 shown in FIG. 3 and FIG. 4. The image output unit 34 includes, for example, an image processing unit 40, a light modulator drive 41, a light source controller 42, a light source 43, an optical lighting unit 44, a light modulator 45, and an optical focusing unit 46.

The image processing unit 40 conducts imaging processes such as analog/digital (A/D) conversion, interlace/progressive (I/P) conversion, scaling process, gamma correction, and noise reduction to image signals input from the CPU 30 (FIG. 3) or the second central processing unit 56 (FIG. 4), and outputs he processed image signals to the light modulator drive 41, wherein such input image signals are processed as image signals adapted to the light modulator 45. Further, imaging processes such A/D conversion, I/P conversion, scaling process, gamma correction process, and noise reduction can be conducted by the image input unit 33 shown in FIGS. 3 and 4.

The light modulator drive 41 outputs image signals processed by the image processing unit 40 to the light modulator 45, and drive the light modulator 45. The light modulator 45 is configured with, for example, three liquid crystal displays (LCDs) corresponding to red (R), green (G), and blue (B). The light emitted from the light source 43 is separated by the optical lighting unit 44 into three colors of R, G, B. Based on the image signals input from the light modulator drive 41, the light modulator 45 modulates each of separated light to imaging light corresponding to each color. The imaging light of each color such as R, G, B can be synthesized, for example, by using a dichroic prism, and the synthesized imaging light is input to the optical focusing unit 46.

Based on light source control signal transmitted from the CPU 30 (FIG. 3) or the second central processing unit 56 (FIG. 4), the light source controller 42 can change current to be supplied to the light source 43 to control light intensity of the light source 43. The light source 43 is, for example, a super-high pressure mercury vapor lamp.

The optical lighting unit 44 includes, for example, an integrator lens to set uniform light profile for the light emitted from the light source 43, a polarization-light conversion element to convert P-wave component (light-wave component parallel to the incidence plane), included in light emitted from the light source 43, to S-wave component (light-wave component perpendicular to the incidence plane) for generating light having high luminance, a dichroic mirror to separate light emitted from the light source 43 into each color of R, G, B. Such units are known units, and thereby the explanation is omitted.

The optical focusing unit 46 is mainly configured with plurality of lenses including the projection lens 11. The plurality of lenses of the optical focusing unit 46 have a light axis perpendicular to the screen 28, and are arranged, for example, in a row along the light axis. Upon receiving the imaging light from the light modulator 45, the optical focusing unit 46 projects and focuses enlarged images on the screen 28.

Figure 6:
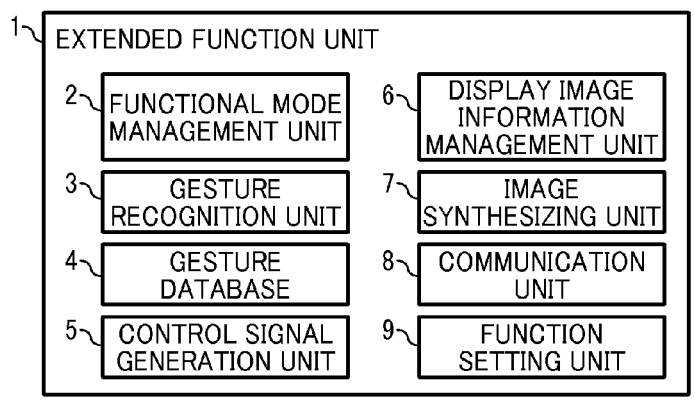
FIG. 6 shows a functional block diagram of a central processing unit according to an example embodiment.

A description is given of functional configuration of the CPU 30 (FIG. 3) or the second central processing unit 56 (FIG. 4) according to an example embodiment with reference to FIG. 6, which shows a functional block diagram of the CPU 30 (FIG. 3) or the second central processing unit 56 (FIG. 4). The CPU 30 or the second central processing unit 56 includes an extended function unit 1. The extended function unit 1 includes, for example, a functional mode management unit 2, a gesture recognition unit 3, a gesture database 4, a control signal generation unit 5, a display image information management unit 6, an image synthesizing unit 7, a communication unit 8, and a function setting unit 9.

Based on operation information input from the operation unit 14 (FIG. 3, FIG. 4), the functional mode management unit 2 controls switching of two modes such as the normal projection mode and the multi-segmented screen operation mode in the image display apparatus 10. The mode shifting between the normal projection mode and the multi-segmented screen operation mode will be described later.

As such, the functional mode management unit 2 controls switching between the normal projection mode and the multi-segmented screen operation mode, and also controls a process of receiving an interrupt request from the PCs 24-27 only when switched to the normal projection mode. As such, the functional mode management unit 2 can be used as a unit to manage functional mode.

Further, when the normal projection mode is set, the functional mode management unit 2 transmits an instruction of power-supply OFF of the image input unit 33 to the power control unit 36 (FIG. 3) or the second power control unit 59 (FIG. 4). Further, when the multi-segmented screen operation mode is set, the functional mode management unit 2 transmits an instruction of power-supply ON of the image input unit 33 to the power control unit 36 (FIG. 3) or the second power control unit 59 (FIG. 4). With such a configuration, because it is not required to capture the gesture of the user 20 when the normal projection mode is set, the power-supply to the image input unit 33, which is used for capturing the gesture of the user 20, is stopped. With such a configuration, power consumption by one or more units, not using its function, can be reduced, in particular can be set zero, by which the power consumption of the image display apparatus 10 can be reduced.

Further, when no operation is conducted for a given time period during the multi-segmented screen operation mode, the functional mode management unit 2 automatically transmits an instruction of shifting to the energy-save mode to the power control unit 36 (FIG. 3) or the first power control unit 55 and the second power control unit 59 (FIG. 4).

Further, when a return instruction is issued, the functional mode management unit 2 transmits an instruction of returning to a mode, which was used just before shifting to the energy-save mode, to the power control unit 36 (FIG. 3) or the first power control unit 55 and the second power control unit 59 (FIG. 4).

Further, the above mentioned given time period used for determining a shift timing to the energy-save mode can be retained in the image display apparatus 10 as a time-limit value, and such time-limit value can be changed by the user 20. With such configuration, unnecessary power consumption during the standby mode can be reduced, and such unnecessary power consumption can be reduced automatically using the time-limit value set by the user 20

The gesture recognition unit 3 can detect the hand movement of the user 20 with respect to the multi-segmented screen image based on the multi-segmented screen image and image of hand movement of the user 20 captured by the image input unit 33.

Further, the gesture recognition unit 3 can recognize a screen image designated as an active-target image in the multi-segmented screen image based on the above detected hand movement. Hereinafter, an image of active-target may be referred with the term of active status.

Further, the gesture recognition unit 3 can recognize a screen image designated as a specific operation-target image in the multi-segmented screen image and the types of hand movement of the user 20 based on the above detected hand movement.

Further, when the hand movement of the user 20 is detected, the gesture recognition unit 3 may recognize a part of hand movement of the user 20. Further, the gesture recognition unit 3 outputs such recognition result to the control signal generation unit 5. As such, the gesture recognition unit 3 can be used as a designated screen image recognition unit.

The gesture recognition unit 3 may conduct recognition process of gesture using, for example, a heat image taken by using infrared light (invisible light image) and a visible light image, in which the heat image and the visible light image are compared to generate a difference-based image to detect the hand movement. In this disclosure, the difference-based image means an image generated by comparing the heat image and the visible light image in view of difference of such images. The infrared image is used to detect body temperature of the user 20, by which hand and face areas can be effectively recognized using the infrared image. The above mentioned visible light image is image data composed of the multi-segmented screen image and the image of hand movement of the user 20 captured by a digital camera disposed in the image input unit 33.

Further, the above mentioned invisible light image such as heat image prepared from the infrared image can be obtained from the image output unit 34 and then outputs to the gesture recognition unit 3. For example, the projection lens 11 of the image output unit 34 includes a germanium lens to detect infrared, and an infrared thermography is disposed for the image output unit 34. The light coming from the multi-segmented screen image and the image of hand movement of the user 20 passes the germanium lens of the projection lens 11, and then is guided to the infrared thermography, wherein the multi-segmented screen image and the image of hand movement of the user 20 are the same images captured by the image input unit 33.

The infrared thermography measures temperature difference at each portion of image based on the light coming from the multi-segmented screen image and the image of hand movement of the user 20. Such temperature difference is indicated by different colors to generate heat image data, and the heat image data is output to the gesture recognition unit 3. As such, the heat image data may be infrared image data, which can be obtained by computing energy amount of infrared radiated from an object, which is a target object of capturing.

Based on the difference-based image prepared by comparing the heat image data such as infrared image (or invisible light image) and image data of visible light image, the gesture recognition unit 3 can detect hands of the user 20. Because the hand of the user 20 is an exposed skin similar to face or neck, the hand of the user 20 can be detected as a high temperature area compared to cloths.

Further, because the infrared image can be captured without an effect of intensity of visible light. Therefore, even if the visible light image cannot be taken with enough light intensity, by generating the difference-based image by comparing the infrared image and the visible light image, an object such as hand position and contour of the user 20 in an image can be correctly recognized. As such, the recognition precision of gesture can be enhanced using a combination of visible light image and invisible light image. The difference-based image is an image that can be obtained by computing the difference of the infrared image and the visible light image.

The gesture database 4 stores a gesture/operation table to which the gesture recognition unit 3 refers information. The information of gesture/operation table is a table format data that stores data prepared by correlating the types of hand movement of the user 20 and specific operation contents for a screen image designated as specific operation-target image. As such, the gesture database 4 can function as a storing unit. The information of gesture/operation table can be stored, for example, in a memory such as the second storage unit 32. The gesture/operation table will be described later.

Based on the recognition result received from the gesture recognition unit 3, the control signal generation unit 5 reads out a corresponding specific operation from the gesture/operation table stored in the gesture database 4, and converts the corresponding specific operation to a control signal. Such control signal is output to the display image information management unit 6.

Further, the control signal generation unit 5 outputs a control signal, indicating a PC corresponding to a screen image designated as an active-target image, to the communication unit 8, and outputs a control signal, indicating a PC corresponding to a screen image not designated as an active-target image, to the communication unit 8.

Further, even if a PC is requested to transmit image data of its PC, the PC cannot transmit the image data due to some reasons. In such a case, the communication unit 8 receives a response from the PC that the PC cannot transmit the image data. Then, the control signal generation unit 5 may conduct followings for display of a screen image corresponding to such PC that cannot transmit the image data. In one case, the control signal generation unit 5 displays a screen image corresponding to such PC that cannot transmit the image data as non-active-target image in the multi-segmented screen image, and in another case, the control signal generation unit 5 stops displaying a screen image corresponding to such PC that cannot transmit the image data in the multi-segmented screen image, which becomes non-display status. As such, the control signal generation unit 5 and the communication unit 8 can be collectively used as an image-display control unit.

The display image information management unit 6 outputs image data corresponding to the screen image of each of the PCs 24-27, input via the interface 16 (FIG. 3) or the second interface 58 (FIG. 4), to the image synthesizing unit 7.

Further, upon receiving the control signals from the signal generation unit 5, the display image information management unit 6 stores and manages display screen image information. The display screen image information is a list of information including, for example, information indicating "active-target" or non-active-target" of each screen image in a multi-segmented screen image to be projected on the screen 28, information of position of screen image after conducting specific operations (e.g., movement, enlarging, reducing) to a screen image designated as specific operation-target image in the multi-segmented screen image. The display image information management unit 6 outputs control signals to the image synthesizing unit 7 based on the display screen image information.

The gesture recognition unit 3 recognizes the types of hand movement of the user 20. The gesture database 4 may include information of specific operation contents corresponding to the types of hand movement of the user 20 recognized by the gesture recognition unit 3 Based on specific operation contents, stored in the gesture database 4, to be conducted for a screen image designated as a specific operation-target image, the control signal generation unit 5 and the display image information management unit 6 can collectively function as a screen image processing control unit to conduct specific operation contents to a screen image designated as a specific operation-target image.

Based on the image data corresponding to the screen image of each of the PCs 24-27 received from the display image information management unit 6, the image synthesizing unit 7 generates image data of multi-segmented screen image by synthesizing the image data corresponding to the screen images of the PCs 24-27, and outputs such synthesized image data to the image output unit 34. As such, based on the image data received from each one of the PCs 24-27 via the interface 16 (FIG. 3) or the second interface 58 (FIG. 4), the image synthesizing unit 7 synthesizes a multi-segmented screen image data composed of the screen images of the PCs 24-27.

The image synthesizing unit 7 synthesizes one screen image by overlaying a plurality of image layers. For example, from the bottom layer to the upper layer, a background layer, a non-active-image layer, and an active-image layer are overlaid in this order, and the most upper layer is the active-image layer. Further, if a plurality of screen images such as non-active-target image(s) and active-target image(s) are overlaid, a screen image that was operated most recently is set as a top image with respect to other screen image.

The communication unit 8 controls data communication with the PCs 24-27. Upon receiving a control signal indicating that a PC, having a screen image designated as active-target image, from the control signal generation unit 5, the communication unit 8 requests such PC to transmit image data, and controls not to receive an interrupt request from a PC having a screen image not designated as active-target image. Further, when the communication unit 8 receives a control signal indicating a PC having a screen image not designated as active-target image, the communication unit 8 controls not to receive an interrupt request from such PC. As such, the communication unit 8 can be used as a unit to control data communication. Further, the communication unit 8 and the control signal generation unit 5 can be collectively used as a signal control unit.

The function setting unit 9 manages various settings. For example, the function setting unit 9 can set the upper limit numbers of displayable screen image that can be designated as active-target image for the image display apparatus 1. The function setting unit 9 can set each screen image of the PCs 24-27 as a display image of non-active-target image or non-display when the PCs 24-27 transmits a not-good (NG) response in return to an image data transmission request from the image display apparatus 10. The function setting unit 9 can set detection conditions of gesture (e.g., hand conditions). The user 20 can change values of settings set by the function setting unit 9 by operating the operation unit 14.

As such, the function setting unit 9 can be used as an upper limit setting unit to set the upper limit numbers of screen image displayable in the multi-segmented screen image as active-target image. The function setting unit 9 can be used as a rewriting unit that can rewrite the types of hand movement of the user 20 and specific operation contents for a screen image, designated as specific operation-target image, stored in the gesture database 4. Further, other functions such as known functions can be included in the extended function unit 1.

Figure 7:
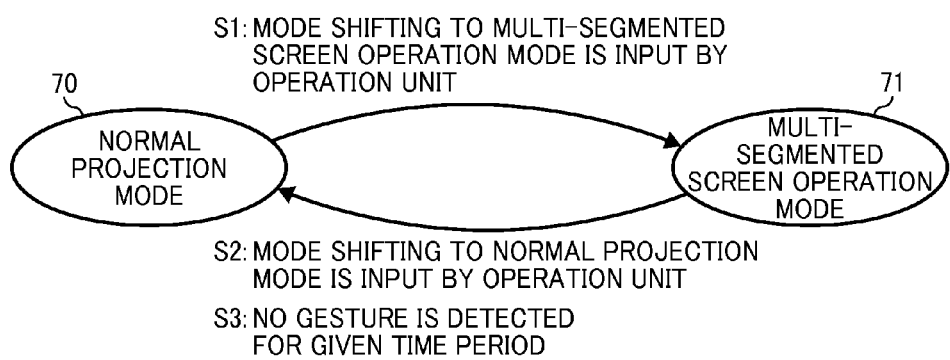
FIG. 7 shows a mode shifting in the image display apparatus of FIGS. 3 and 4.

A description is given of a mode shifting of the image display apparatus 10 with reference to FIG. 7. FIG. 7 shows a mode shifting in the image display apparatus shown in FIG. 3 and FIG. 4. The image display apparatus 10 may be provided with two modes such as the normal projection mode 70 and the multi-segmented screen operation mode 71. In such mode shifting or switching, the user 20 may operate the operation unit 14 for selecting the normal projection mode 70 or the multi-segmented screen operation mode 71, and then the functional mode management unit 2 (FIG. 6) controls the mode shifting or switching between the normal projection mode 70 and the multi-segmented screen operation mode 71.

In the normal projection mode 70, the image display apparatuses 10 (10a) (hereinafter, image display apparatus 10) provides only a normal projection function. In the multi-segmented screen operation mode 71, the image display apparatus 10 provides a function of projecting a multi-segmented screen image according to an example embodiment.

When the power button 15 is set ON, the power-supply starts for the image display apparatus 10, and the image display apparatus 10 is set to the normal projection mode 70. When a mode shifting or switching operation to the multi-segmented screen operation mode 71 is input during the normal projection mode 70 (step S1 of FIG. 7) from the operation unit 14, the functional mode management unit 2 (FIG. 6) shifts or switches the image display apparatus 10 to the multi-segmented screen operation mode 71.

Further, when a mode shifting or switching operation to the normal projection mode 70 is input during the multi-segmented screen operation mode 71 (step S2 of FIG. 7) from the operation unit 14, the functional mode management unit 2 (FIG. 6) shifts or switches the image display apparatus 10 to the normal projection mode 70. Further, when no gesture is detected for a given time period during the multi-segmented screen operation mode 71 (step S3 of FIG. 7), the functional mode management unit 2 (FIG. 6) shifts or switches the image display apparatus 10 to the normal projection mode 70.

During the normal projection mode 70, the image display apparatus 10 can be accessed from any one of the PCs 24-27 via a network such as wireless LAN. In contrast, during the multi-segmented screen operation mode 71, the image display apparatus 10 can be accessed from only a designated PC among the PCs 24-27 such as a PC having a screen image designated by a gesture operation. Specifically, when the image capture device 12 of the image display apparatus 10 captures a gesture operation that designates a screen image corresponding to one PC as an active PC (e.g., PC 24), image data can be transmitted to the image display apparatus 10 only from the active PC (e.g., PC 24), and the image display apparatus 10 does not receive an interrupt request from other PCs (e.g., PC 25-27) having non-active image.

Further, when the mode is shifted or switched, the mode status (i.e., normal projection mode 70, multi-segmented screen operation mode 71) of the image display apparatus 10 can be reported to the user 20. For example, when the mode is shifted or switched between the normal projection mode 70 and the multi-segmented screen operation mode 71, the functional mode management unit 2 transmits an instruction of controlling lamp-ON/OFF of the lamp unit 13 to the power control unit 36 (FIG. 3) or the first power control unit 55 (FIG. 4).

For example, the lamp unit 13 can be set at lamp-ON using yellow color light during the normal projection mode 70, and the lamp unit 13 can be set at lamp-ON using red color light during the multi-segmented screen operation mode 71. Further, the lamp unit 13 can be kept at lamp-ON during the normal projection mode 70, and the lamp unit 13 can be set at lamp-flashing during the multi-segmented screen operation mode 71. With such configurations, the user 20 can easily recognize which mode (i.e., normal projection mode 70, multi-segmented screen operation mode 71) is set for the image display apparatus 10, by which user-friendly operation can be enhanced.

As above described, when the user 20 is making his presentation during the multi-segmented screen operation mode 71, even if the users 21 to 23 issue operation interrupt requests from the corresponding PC 25 to 27, such requests are not received by the image display apparatus 10. Therefore, when the user 20 is making his presentation, an interrupt request from other users can be blocked during the presentation, by which the user 20 can make his presentation without concerns such as interruption by other PCs or users.

Further, if the gesture recognition unit 3 does not detect the hand movement of the user 20 for a given time period during the multi-segmented screen operation mode 71, the functional mode management unit 2 transmits an instruction of shifting to the energy-save mode to the power control unit 36 (FIG. 3) or the second power control unit 59 (FIG. 4) to reduce power consumption of the image display apparatus 10. Based on such instruction for shifting to the energy-save mode received from the functional mode management unit 2, the power control unit 36 (FIG. 3) or the second power control unit 59 (FIG. 4) stops power-supply to a given section such as a main section of the image display apparatus 10 and shifts to the energy-save mode.

Further, when the mode is shifted or switched to the normal projection mode, the functional mode management unit 2 transmits an instruction of power-supply stop to the image input unit 33 to the power control unit 36 (FIG. 3) or the second power control unit 59 (FIG. 4). Based on such instruction for power-supply stop received from the functional mode management unit 2, the power control unit 36 (FIG. 3) or the second power control unit 59 (FIG. 4) stops power-supply to the image input unit 33 of the image display apparatus 10. With such a configuration, unnecessary power consumption of the image display apparatus 10 can be reduced.

A description is given of projection of a multi-segmented screen image. For example, when the user 20 starts a meeting by shifting the image display apparatus 10 to the multi-segmented screen operation mode 71, the image display apparatus 10 projects a multi-segmented screen image, generated by synthesizing each screen image of the PCs 24-27, on the screen 28 as a first process of the multi-segmented screen operation mode 71.

Figure 8:
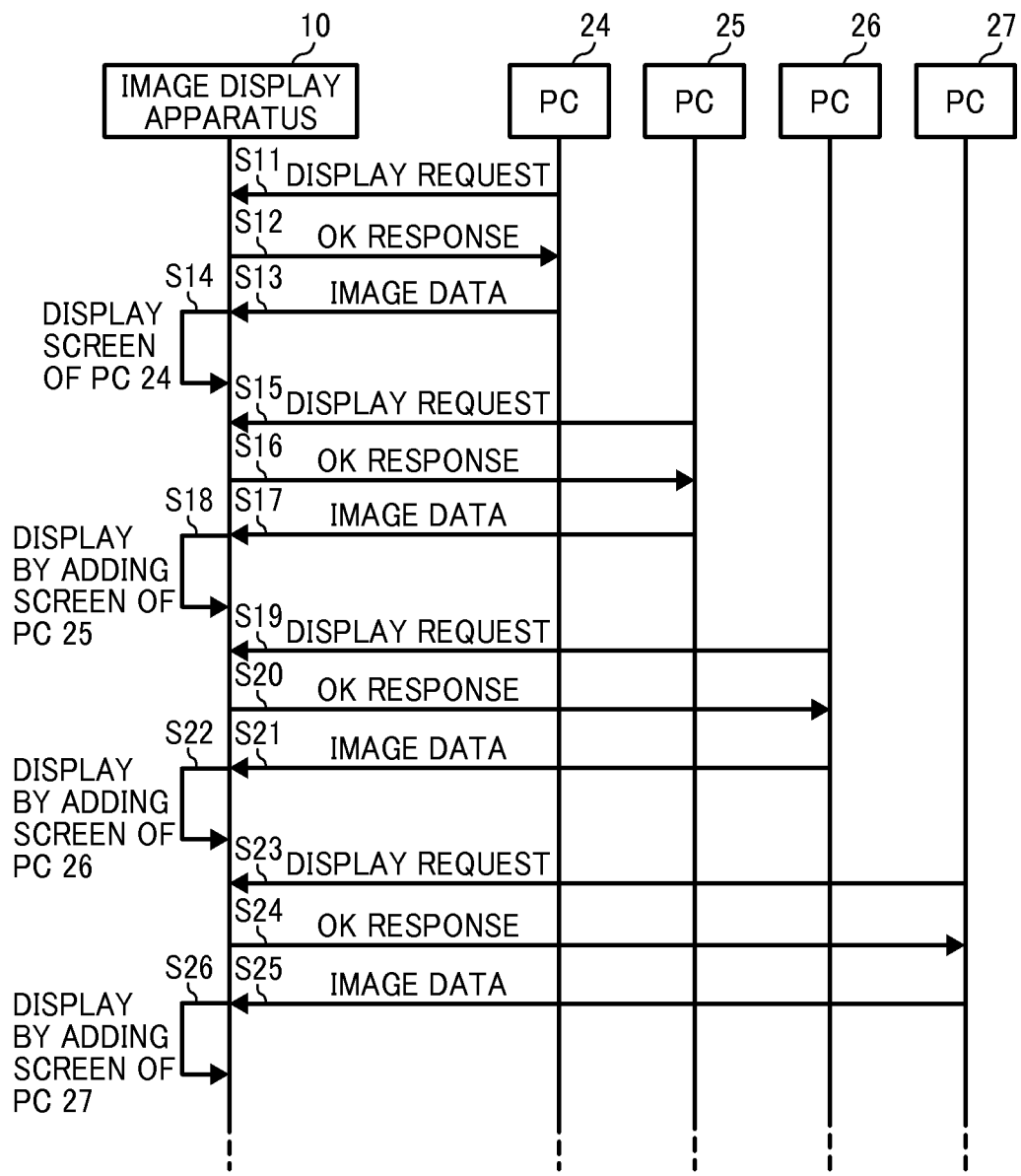
FIG. 8 shows a sequence of communication process between the image display apparatus of FIGS. 3 and 4 and PCs when the image display apparatus projects a multi-segmented screen image generated by synthesizing screen images of PCs on a screen.

A description is given of process of projection of a multi-segmented screen image with reference to FIG. 8, which shows a sequence of communication process between the image display apparatus 10 and the PCs 24-27 when the image display apparatus 10 projects the multi-segmented screen image, generated by synthesizing each screen image of the PCs 24-27, on the screen 28

As an initial condition to start such sequence process, the image display apparatus 10 is switched to the multi-segmented screen operation mode. Further, communication addresses are already set for the image display apparatus 10 and the PCs 24-27 used by the users 20 to 23, by which each of the PCs 24-27 can communicate with the image display apparatus 10.

At step S11 of FIG. 8, the PC 24 transmits a display request to the image display apparatus 10 with its own communication address. At step S12, the image display apparatus 10 transmits OK response for the display request to the PC 24. At step S13, the PC 24 transmits image data of screen image of the PC 24 to the image display apparatus 10. At step S14, the image display apparatus 10 projects only a screen image of the PC 24 in a multi-segmented screen image on the screen 28.

Further, at step S15, the PC 25 transmits a display request to the image display apparatus 10 with its own communication address. At step S16, the image display apparatus 10 transmits OK response for the display request to the PC 25. At step S17, the PC 25 transmits image data of screen image of the PC 25 to the image display apparatus 10. At step S18, the image display apparatus 10 projects the screen image of the PC 24 and the screen image of the PC 25 in the multi-segmented screen image on the screen 28 by adding the screen image of the PC 25 in the multi-segmented screen image.

Further, at step S19, the PC 26 transmits a display request to the image display apparatus 10 with its own communication address. At step S20, the image display apparatus 10 transmits OK response for the display request to the PC 26. At step S21, the PC 26 transmits image data of screen image of the PC 26 to the image display apparatus 10. At step S22, the image display apparatus 10 projects the screen images of the PC 24 and PC 25, and the screen image of the PC 26 in the multi-segmented screen image on the screen 28 by adding the screen of the PC 26 in the multi-segmented screen image.

Further, at step S23, the PC 27 transmits a display request to the image display apparatus 10 with its own communication address. At step S24, the image display apparatus 10 transmits OK response for the display request to the PC 27. At step S25, the PC 27 transmits image data of screen image of the PC 27 to the image display apparatus 10. At step S26, the image display apparatus 10 projects the screen images of the PCs 24 to 26 and the screen image of the PC 27 in the multi-segmented screen image on the screen 28 by adding the screen of the PC 27 in the multi-segmented screen image. With such processing, the image display apparatus 10 projects the multi-segmented screen image including each screen image of the PCs 24-27 on the screen 28.

In such a configuration, the user 20 may operate the operation unit 14 of the image display apparatus 10 to switch or shift to the multi-segmented screen operation mode, by which the image display apparatus 10 shifts to the multi-segmented screen operation mode, and then a meeting starts. If communication conditions are not so good during the above sequence of communication process and the screen image cannot be displayed, the PCs 24-27 may issue display requests again.

The communication protocol between the image display apparatus 10 and the PCs 24-27 can use any protocols such as simple object access protocol (SOAP) of web service, and representational state transfer (REST), but not limited these.

Further, the image display apparatus 10 may not transmit no-good (NG) response to the requests from the PCs 24-27 most of the time, but if the numbers of display requests exceeds the upper limit numbers of displayable screen image simultaneously in the multi-segmented screen image, the image display apparatus 10 may transmit a no-good (NG) response.

The upper limit numbers of screen image displayable in the multi-segmented screen image can be restricted as follows. For example, the user 20 inputs the upper limit numbers of displayable screen image using the operation unit 14. Then, based on the input upper limit numbers of displayable screen image, the function setting unit 9 (FIG. 6) sets the upper limit numbers of displayable screen image designate-able as active-target image in the multi-segmented screen image, and instructs the communication unit 8 not to receive a display request when the numbers of display request exceeds the upper limit numbers of displayable screen image. Upon receiving such instruction, the communication unit 8 restricts a display request of screen image transmitted from an external apparatus. Further, by setting a non-display condition for one of currently displayed screen images, a new screen image can be added and displayed in the multi-segmented screen image.

Figure 9:
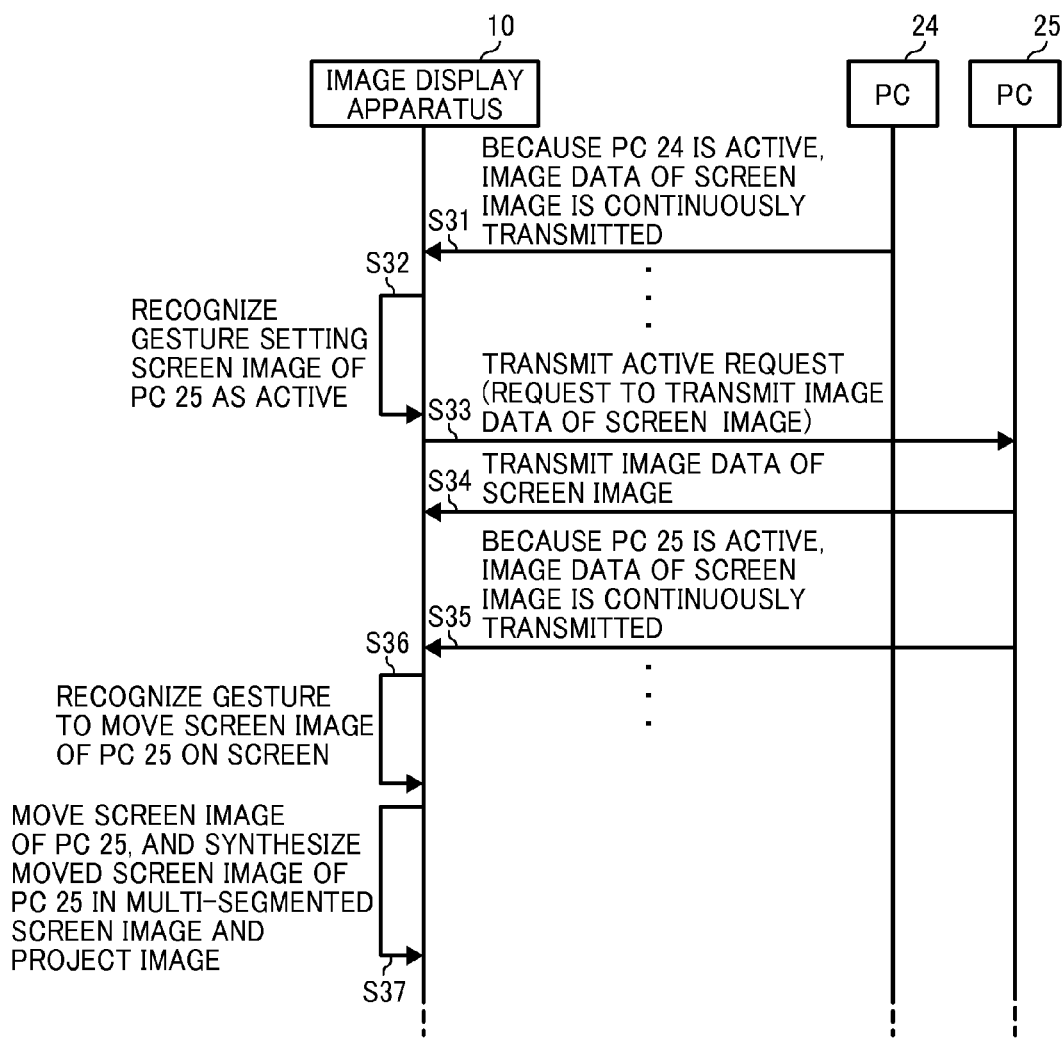
FIG. 9 shows a sequence of communication process between the image display apparatus of FIGS. 3 and 4 and PCs when the image display apparatus is used to operate a screen image in the multi-segmented screen image.

With reference to FIG. 9, a description is given of communication process between the image display apparatus 10 and the PCs 24-25 when the user 20 operates a screen image in the multi-segmented screen image using his gesture during a meeting. FIG. 9 shows a sequence of communication process between the image display apparatus 10 and the PCs 24-25 when the user 20 operates a screen image in the multi-segmented screen image projected by the image display apparatus 10. As an initial condition to start such sequence process, the image display apparatus 10 is switched to the multi-segmented screen operation mode.

Further, communication is established between the image display apparatus 10 and the PC 24 to PC 27 to communicate information, but the image display apparatus 10 does not receive interrupt requests from the PC 25 to PC 27. Further, the screen image of the PC 24 in the multi-segmented screen image on the screen 28 (FIG. 1) is at active status, the screen image of the PC 25 is non-active status. Further, the screen images of the PC 26 and PC 27 are non-active status. At step S31 of FIG. 9, because the PC 24 is at the active status, image data is continuously transmitted to the image display apparatus 10 from the PC 24.

When the image display apparatus 10 detects the hand movement of the user 20 with respect to the multi-segmented screen image on the screen 28, at step S32, based on the detection result, the image display apparatus 10 recognizes the gesture that sets the screen image of the PC 25 on the screen 28 as active status.

At step S33, the image display apparatus 10 transmits an active request to the PC 25. With such active request, the image display apparatus 10 requests the PC 25 to transmit image data of current screen image of the PC 25 to the image display apparatus 10. At step S34, the PC 25 transmits image data of the screen image to the image display apparatus 10. Then, the image display apparatus 10 updates the screen image of the PC 25 projected in the multi-segmented screen image based on the image data of screen image transmitted from the PC 25.

If the PC 25 issues a not-good (NG) response to the active request, the PC 25 transmits the NG response to the image display apparatus 10. In this case, the contents of the screen image of the PC 25 in the multi-segmented screen image is not updated.

At step S35, because the PC 25 is at the active status, image data of screen image is continuously transmitted to the image display apparatus 10 from the PC 25. As such, when the image display apparatus 10 receives OK response, the screen image of the PC 25 in the multi-segmented screen image on the screen 28 is set at the active status, and received image data of the latest screen image of the PC 25 is projected. Further, because the PC 24 is still at the active status, contents of the screen image of the PC 24 can be updated continuously.

With such a configuration, displayed contents of the screen images of the PCs 24 and 25 in the multi-segmented screen image on the screen 28 can be sequentially updated, and thereby the user 20 can proceed the presentation for a meeting based on contents of the screen images of the PCs 24 and 25 in the multi-segmented screen image. Further, because the image display apparatus 10 can set the active status with only PC required to be communicated among a plurality of the PCs 24-27, unnecessary increased communication data size between the image display apparatus 10 and the PCs 24-27 can be prevented, by which the processing load of data communication in the image display apparatus 10 can be reduced.

Further, when the image display apparatus 10 detects a new hand movement of the user 20 with respect to the multi-segmented screen image on the screen 28, steps S36 and S37 are conducted. At step S36, based on the detection result, the image display apparatus 10 can recognize a gesture to move the screen image of the PC 25 in the multi-segmented screen image on the screen 28, and recognizes a movement direction and a movement amount of such movement.

At step S37, the image display apparatus 10 moves the screen image of the PC 25 in the multi-segmented screen image in line with the recognized movement direction with the movement amount, and then synthesizes the screen image of the PC 25 in the multi-segmented screen image, and projects the multi-segmented screen image. Although the screen image movement is described, but various operations can be conducted for screen image in the multi-segmented screen image. For example, the size of screen image can be enlarged or reduced.

A description is given of a process by the image display apparatus 10 when operating the screen image in the multi-segmented screen image with reference to FIGS. 6, 10, 11, and 12.

Figure 10:
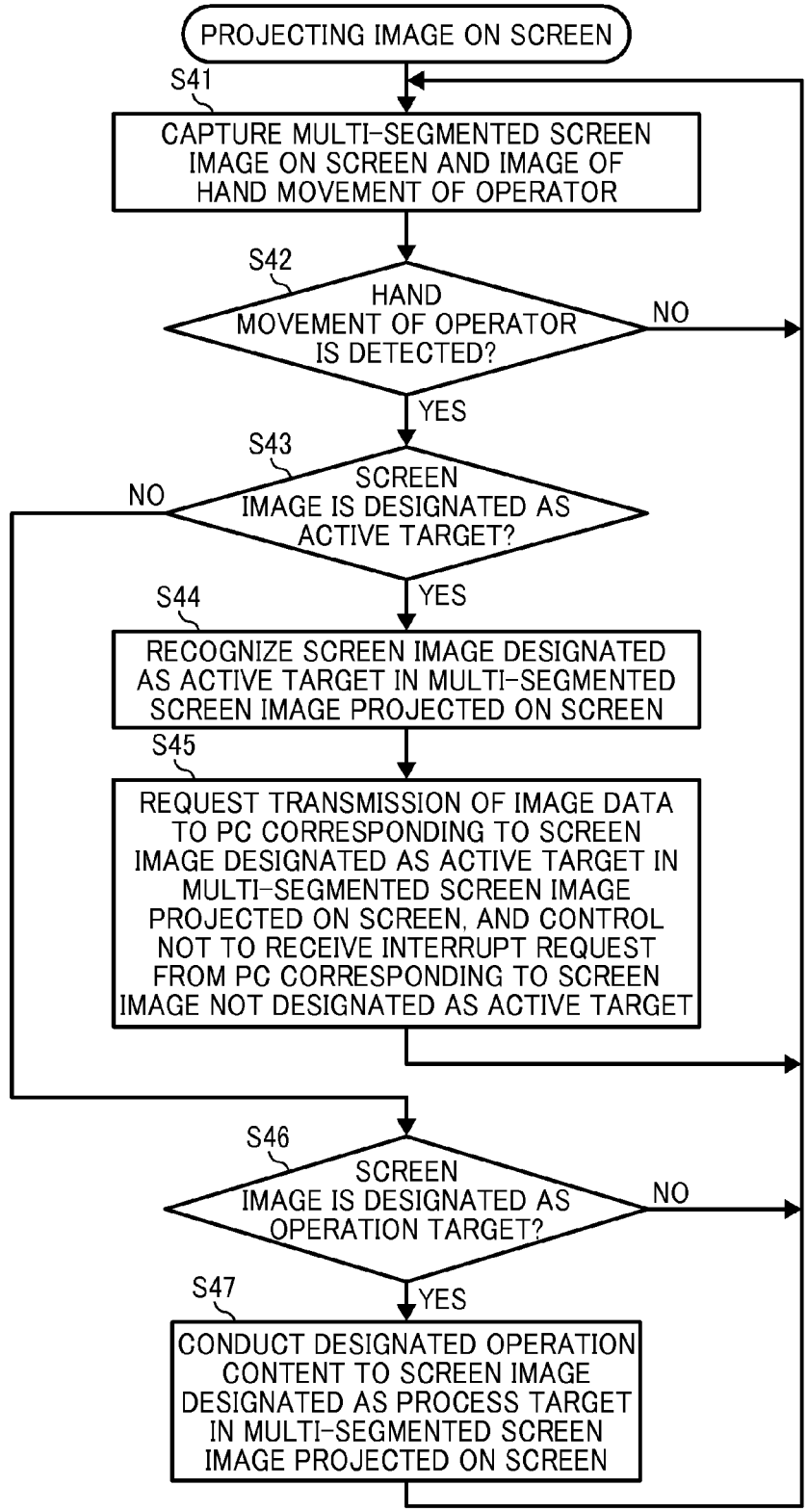
FIG. 10 shows a flowchart of steps of process when the image display apparatus is used to operate a screen image in the multi-segmented screen image.

FIG. 10 shows a flowchart of process by the image display apparatus 10 when operating the screen image in the multi-segmented screen image. FIG. 11 shows an example of a gesture/operation table stored in the gesture database 4. FIG. 12 shows an example of display screen image information for multi-segmented screen image managed by the display image information management unit 6.

As shown in FIG. 11, the gesture/operation table stores each type of gestures and corresponding specific operation contents. Further, the display screen image information shown in FIG. 12 includes the screen image position in the multi-segmented screen image, and flags indicating active or non-active for each of terminal apparatuses such as PCs 24 to 27 connected to the image display apparatus 10. Further, the display screen image information includes information indicating a layer of each screen image in the multi-segmented screen image, and Internet protocol (IP) address for each terminal apparatus.

When the image display apparatus 10 is projecting the multi-segmented screen image on the screen 28 using the multi-segmented screen operation mode 71, at step S41 of FIG. 10, the multi-segmented screen image on the screen 28 and an image of hand movement of an operator such as the user 20 (e.g., speaker) may be captured, and proceed to step S42. The process at step S41 is conducted by the image input unit 33. Specifically, the image capture device 12 of the image input unit 33 captures the multi-segmented screen image on the screen 28 and an image of hand movement of the user 20, and outputs the captured image data to the gesture recognition unit 3.

At step S42, it is determined whether the hand movement of the operator is detected. If it is determined that the hand movement is detected (step S42: YES), proceed to step S43, and if it is determined that the hand movement is not detected (step S42: NO), return to step S41. The process at step S42 is conducted by the gesture recognition unit 3. The gesture recognition unit 3 detects the hand movement based on image data input from the image input unit 33. For example, the gesture recognition unit 3 detects the hand movement based on difference-based image obtained from invisible light image such as infrared image and visible light image.

At step S43, it is determined whether a screen image is designated as an active-target image. If it is determined that the screen image is designated as the active-target image (step S43: YES), proceed to step S44, and if it is determined that the screen image is not designated as the active-target image (step S43: NO), proceed to step S46. The process at step S43 is conducted by the gesture recognition unit 3. Specifically, the gesture recognition unit 3 refers the gesture/operation table stored in the gesture database 4 to search specific operation contents corresponding the detected hand movement, and recognizes whether the detected hand movement sets the screen image as the active-target.

For example, the gesture recognition unit 3 detects a gesture from a movement of a hand of the user 20 such as movement of right and/or left hands. Further, the gesture recognition unit 3 can be configured to detect only a movement of a given portion of hand of the user 20. Further, the gesture recognition unit 3 can be configured to detect only a movement of one finger such as an index finger of the user 20 used as a pointer for moving a screen image. Such detection can be conducted using known methods, and thereby the explanation is omitted. With such a configuration, detection of gestures not intended by a user can be prevented, and user-friendly operation can be enhanced.

Further, the above detected hand movement may be a rotation of a finger for a target screen image. For example, when a finger pointing a target screen is rotated in a clockwise direction while maintaining dragging of screen image, such finger movement can be recognized as a movement that designates the screen image as active-target image based on the specific operation contents corresponding to such finger movement shown in the gesture/operation table of FIG. 11. As such, at step S44, when a screen image, designated as active-target image in the multi-segmented screen image displayed on the screen 28, is recognized by the gesture recognition unit 3, proceed to step S45. The process at step S44 is conducted by the gesture recognition unit 3.

Upon recognizing the screen image set to the active status by the above detected hand movement, the gesture recognition unit 3 refers to display screen image information in the display image information management unit 6 to recognize which screen image is designated by the above detected hand movement. For example, by referring the display screen image information (FIG. 12), the gesture recognition unit 3 searches the display screen image information to determine which screen image positions corresponds to positions of the above detected hand movement with respect to the screen 28.

For example, if the position of the above detected hand movement corresponds to the screen image position of the PC 25 (X=0, Y=50, W=150, H=200), a flag of the PC 25 in the active column is changed to "ON" to indicate active status, and then it is recognized that the above detected hand movement designates the screen image of the PC 25, and outputs the recognition result to the communication unit 8.

At step S45, a request of image data transmission is transmitted to a PC corresponding to the screen image designated as active-target image in the multi-segmented screen image displayed on the screen 28, and it is controlled not to receive an interrupt request from a PC not corresponding to the screen image designated as active-target image, and then return to step S41. With such processing, only the screen images of the PCs 24 and PC 25 in the multi-segmented screen image, displayed on the screen 28, can be set with activate-status.

The process at step S45 is conducted by the communication unit 8 based on the recognition result of the gesture recognition unit 3. Upon receiving the recognition result that the screen image of the PC 25 is designated as the active-target image from the gesture recognition unit 3, the communication unit 8 refers to display screen image information (FIG. 12) in the display image information management unit 6, and obtains an IP address of the PC 25. For example, IP address of "yyy. yyy. yyy. yyy" set for the PC 25 is read out from the display screen image information (FIG. 12). Based on the read IP address, the communication unit 8 requests the PC 25 to transmit image data of screen image of the PC 25.

Further, because a flag of the active column of the PCs 26 and 27 is set "OFF" in the display screen image information stored in the display image information management unit 6, the communication unit 8 controls not to receive an interrupt request from the PCs 26 and 27 corresponding to the screen images of non-active-target image.

When the extended function unit 1 (FIG. 6) requests image data transmission to the PC 25 and receives NG response from the PC 25 that the PC 25 cannot transmit image data, the display screen image information in the display image information management unit 6 can be written, in which the display style of the screen image of the PC 25 in the multi-segmented screen image can be changed to an image displayed under non-active status, or the screen image of the PC 25 is not displayed (non-display status). As such, when NG response is received from a PC corresponding to a screen image displayed in the multi-segmented screen image, a user can change the settings between the image display under non-active status (screen image of PC is displayed under non-active status) or non-display (screen image of PC is not displayed). Therefore, an operation such as manual operation is not required to set the screen image of PC as non-display, by which user-convenience or user-friendliness can be enhanced.

Further, the upper limit numbers of the screen image that can be set at the active status in the multi-segmented screen image can be set. Specifically, upon receiving the upper limit numbers of the screen image input by the user 20 from the operation unit 14, the function setting unit 9 monitors the numbers of flag set "ON" (i.e., active) in the active column of display screen image information stored in the display image information management unit 6. Specifically, if the gesture recognition unit 3 sets the flag "ON" for PCs with a number exceeding the upper limit numbers of the screen image, the function setting unit 9 restricts the numbers of "ON" flag within the upper limit numbers of the screen image.

Further, if the numbers of the screen image concurrently set as active status is to exceed the upper limit numbers of displayable screen image, one of screen images currently active can be automatically set to a non-active-target image, in which a screen image which becomes active status at first compared other screen images can be automatically set as the non-active-target image, by which the numbers of the screen image simultaneously set as active status can be adjusted. With such a configuration, communication data size between the image display apparatus 10 and a plurality of the PCs 24-27 can be adjusted by the user 20 with his discretion.

Further, in the above described processing, the screen image of the PC 24 may be set non-active status when the screen image of the PC 25 is set active status. In such a case, because the screen image of the PC 25 is at active status when the image display apparatus 10 communicates with the PC 25, image data of screen image of the PC 25 is being transmitted to the image display apparatus 10. Then, when the screen image of the PC 24 is set non-active status, communication from the PC 24 to the image display apparatus 10 is stopped, and it is switched to the communication only from the PC 25 to the image display apparatus 10.

Then, at step S46 of FIG. 10, it is determined whether a screen image is designated as a specific operation-target image. If it is determined that the screen image is designated as the specific operation-target image (S46: YES), proceed to step S47, and if it is determined that the screen image is not designated as specific operation-target image (S46: NO), return to step S41. The process at step S46 is conducted by the gesture recognition unit 3. Specifically, the gesture recognition unit 3 recognizes the screen image designated as a specific operation-target image in the multi-segmented screen image, and recognizes the types of hand movement of the user 20 by referring the gesture/operation table in the gesture database 4 based on the above detected hand movement.

For example, the above detected hand movement may be a movement of index finger into upward direction of a target screen image while the target screen image is pointed by the index finger one second or more with a dragging condition of screen image. In such a case, by referring the gesture/operation table (FIG. 11), such movement is recognized for moving the screen image in the upward direction based on specific operation contents corresponding to such movement.

At step S47, the designated specific operation contents is conducted for the screen image designated as the specific operation-target image in the multi-segmented screen image displayed on the screen 28, and return to step S41. The process at step S47 is conducted by the control signal generation unit 5 and the display image information management unit 6.

The gesture recognition unit 3 recognizes the types of hand movement of the user 20. The types of hand movement of the user 20 can be corresponded to specific operation contents stored in the gesture database 4. Based on specific operation contents set for the designated screen image, the control signal generation unit 5 generates control signals for conducting the specific operation contents to the designated screen image, and transmits the control signals to the display image information management unit 6.

Upon receiving the control signals from the control signal generation unit 5, the display image information management unit 6 rewrites the display screen image information, and transmits the rewritten display screen image information to the image synthesizing unit 7. Further, based on the rewritten display screen image information, the image synthesizing unit 7 updates display contents of the multi-segmented screen image.

For example, if an action to move the screen image of the PC 25 in the multi-segmented screen image into the upward direction is conducted, the screen image of the PC 25 is moved to an end position of the hand movement of the user 20 in the multi-segmented screen image Further, for example, if the user 20 changes his palm of hand from "rock" to "paper" for a target screen image, the size of the screen image of the PC 25 can be enlarged in the multi-segmented screen image depending on the open size of hand, and the enlargement of screen image of the PC 25 can be continued until the hand movement stops.

Such up/down/left/right movement (including very small adjustment movement in up/down/left/right) and the size adjustment operation such as enlarging and reducing operation for the screen image in the multi-segmented screen image, which are different from operations to set an active status for a screen image, can be conducted without information communication with the PC 25, and image can be synthesized after such movement. Therefore, the image display apparatus 10 does not need information communication with the PC 25 in such cases, by which processing load of data communication can be reduced.

Figure 13:
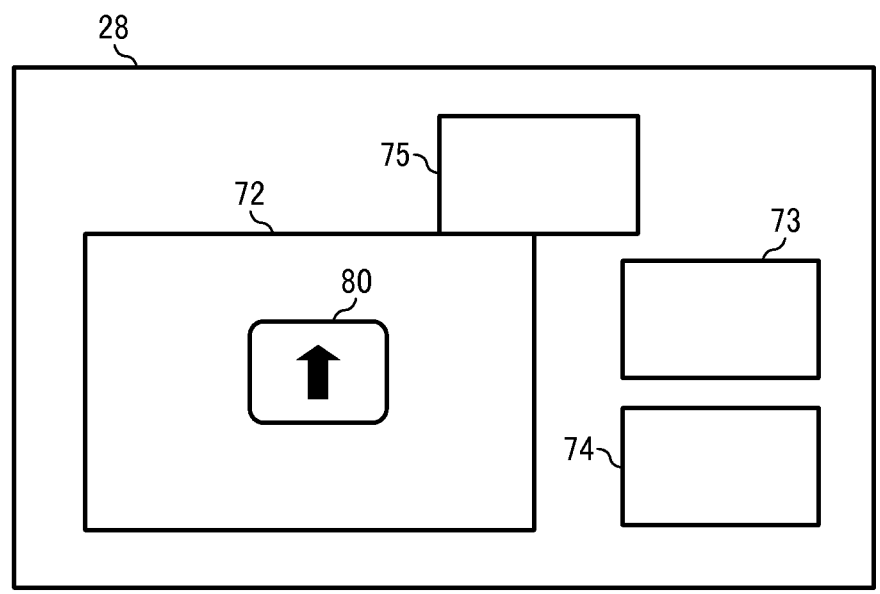
FIG. 13 shows an example of multi-segmented screen image on a screen of FIG. 1.
Figure 14:
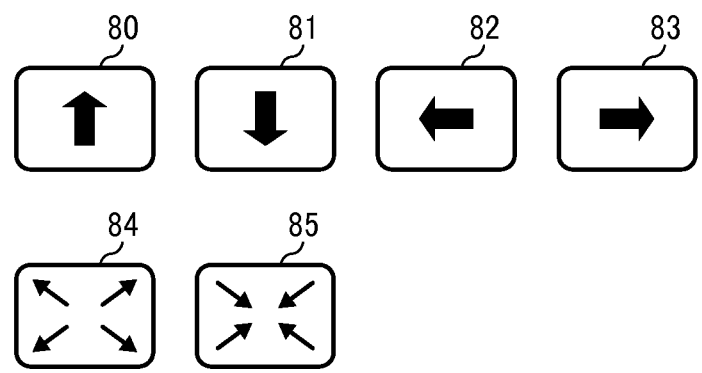
FIG. 14 shows example images of specific operation contents corresponding to the types of hand movement of a user.

A description is given of a process of displaying images of specific operation contents corresponding to the types of hand movement of the user 20 for the screen image in the multi-segmented screen image with reference to FIGS. 13 and 14.

In the above described processing, images corresponding to the types of hand movement of the user 20 recognized by the gesture recognition unit 3 can be displayed (e.g., projected) on the screen 28. In such processing, for example, image data corresponding to each specific operation contents stored in the gesture/operation table in the gesture database 4 is stored in advance. For example, the image data can be stored in the second storage unit 32.

Further, the control signal generation unit 5 transmits control signals including information of specific operation contents and image data corresponding to specific operation contents to the display image information management unit 6. Based on such control signals received from the control signal generation unit 5, the display image information management unit 6 transmits control signals of such image data corresponding the specific operation contents to the image synthesizing unit 7 so that an image corresponding such image data is to be displayed on the screen image designated as an active-target image in the multi-segmented screen image. With such processing, an image matched to the types of hand movement of the user 20 recognized by the gesture recognition unit 3 can be projected on the screen 28 using the image output unit 34.

FIG. 13 shows an example of multi-segmented screen image on the screen 28, in which screen images 72 to 75 corresponding to screen images of the PCs 24-27 are displayed on the screen 28. Further, an image upward movement mark 80 is displayed in the screen image 72. The image upward movement mark 80 is an image indicating the user 20 makes a gesture to move the screen image 72 in the upward direction. As such, by confirming the image upward movement mark 80 on the screen 28, the user 20 can recognize that his gesture is correctly processed by the image display apparatus 10, by which the user 20 can proceed the presentation during a meeting without bothering whether his gesture is correctly processed with respect to the multi-segmented screen image.

FIG. 14 shows example images prepared for specific operation contents corresponding to the types of hand movement of the user 20. As shown in FIG. 14, the image upward movement mark 80 corresponds a specific operation contents to move an active-target screen image in the upward direction; an image downward movement mark 81 corresponds a specific operation contents to move an active-target screen image in the downward direction; an image left movement mark 82 corresponds a specific operation contents to move an active-target screen image into left; and an image right movement mark 83 corresponds to a specific operation contents to move an active-target screen image into right. Further, an image enlarging mark 84 corresponds to a specific operation contents to enlarge the size of an active-target screen image, and an image reducing mark 85 corresponds to a specific operation contents to reduce the size of an active-target screen image. Such marks 80 to 85 are just example images, and other images can be used. Further, specific operation contents can be displayed using moving images.

Further, the gesture/operation table stored in the gesture database 4 can be rewritten. For example, when the user 20 inputs a rewriting instruction of the gesture/operation table from the operation unit 14, the function setting unit 9 rewrites the gesture/operation table stored in the gesture database 4 using a gesture/operation table received from an external apparatus. For example, such external apparatus may be the PC 24 to PC 27.

Further, the gesture/operation table can be received from a server on a network. Further, the gesture/operation table can be received from an apparatus or storage externally connected to the image display apparatus 10. With such a configuration, the types of gestures and specific operation contents stored in the gesture/operation table can be changed freely, by which various gestures of user can be set, and user-convenience or user-friendliness can be enhanced.

In the above described example embodiment of the image display apparatus 10, active status and non-active status of communication between the image display apparatus 10 and a plurality of PCs 24 to 27 can be switched from the image display apparatus 10 freely, by which unnecessary communication between the image display apparatus 10 and the plurality of PCs 24 to 27 can be reduced, by which data communication size between the image display apparatus 10 and the plurality of PCs 24 to 27 can be reduced. Further, the above described example embodiment can be applied to any types of image display apparatus, which can project or display images such as projectors, but not limited these.

In the above described example embodiment, the status of communication between an image display apparatus and a plurality of information processing apparatuses can be switched between active and non-active from the image display apparatus freely.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium or carrier medium for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, or the like such as a programmed processor, a circuit, an application specific integrated circuit (ASIC), used singly or in combination.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image display apparatus, comprising:
a communication unit, using a processing device, to communicate with a plurality of information processing apparatuses;
an image synthesizing unit, using the processing device, to synthesize a multi-segmented screen image data composed of screen images of the plurality of information processing apparatuses based on image data received from each of the plurality of information processing apparatuses through the communication unit;
a projection unit to project the multi-segmented screen image data synthesized by the image synthesizing unit as a multi-segmented screen image onto a screen;
a functional mode management unit, using the processing device, to control switching between a normal projection mode and a multi-segmented screen operation mode, wherein the functional mode management unit receives an interrupt request from each of the information processing apparatuses when switched to the normal projection mode;
an image capture device to capture the multi-segmented screen image displayed on the screen and an image of hand movement of an operator with respect to the multi-segmented screen image when the functional mode management unit switches to the multi-segmented screen operation mode;
a designated screen image recognition unit, using the processing device, to detect a hand movement of the operator with respect to the multi-segmented screen image based on the multi-segmented screen image and the image of hand movement of the operator captured by the image capture device, and to recognize a screen image designated as an active-target image in the multi-segmented screen image based on the detected hand movement; and
a signal control unit, using the processing device, to transmit a request of image data transmission to an information processing apparatus corresponding to the screen image designated as the active-target image by the designated screen image recognition unit, and not to receive an interrupt request from an information processing apparatus corresponding to a screen image of a non active-target image.

2. The image display apparatus of claim 1, further comprising an upper limit setting unit, using the processing device, to set upper limit numbers of screen images displayable as active-target images in the multi-segmented screen image.

3. The image display apparatus of claim 1, wherein the designated screen image recognition unit recognizes a screen image designated as a specific operation-target image and a type of hand movement of the operator for the multi-segmented screen image based on the detected hand movement,
   wherein the image display apparatus further comprising a storing unit, using the processing device, storing types of hand movement of the operator corresponded with specific operation contents applicable for a screen image displayed in the multi-segmented screen image,
   wherein the image display apparatus further comprising a screen image processing control unit, using the processing device, to conduct processing of specific operation contents, corresponding to the type of hand movement of the operator recognized by the designated screen image recognition unit and stored in the storing unit, to a screen image designated as a specific operation-target image.

4. The image display apparatus of claim 3, further comprising a rewriting unit to rewrite the type of hand movement of the operator and specific operation contents stored in the storing unit.

5. The image display apparatus of claim 3, wherein the projection unit projects an image corresponding to the type of hand movement of the operator recognized by the designated screen image recognition unit.

6. The image display apparatus of claim 1, further comprising an image-display control unit, wherein when the signal control unit requests a specific information processing apparatus to transmit image data and the specific information processing apparatus transmits a response indicating that transmission of the image data is not possible, the image-display control unit changes a display style of a screen image corresponding to the specific information processing apparatus in the multi-segmented screen image to a non-active-target image or a non-display.

7. The image display apparatus of claim 1, wherein the designated screen image recognition unit detects a movement of at least a part of hand of the operator when detecting the hand movement of the operator.

8. The image display apparatus of claim 1, further comprising a notification unit to report which one of the normal projection mode and the multi-segmented screen operation mode is set by the functional mode management unit.

9. The image display apparatus of claim 1, further comprising a power-save shift unit, using the processing device, to shift to an energy-save mode to reduce power consumption when the designated screen image recognition unit does not detect a hand movement of the operator for a given time period.

10. The image display apparatus of claim 1, further comprising a power-supply stop unit, using the processing device, to stop power-supply to the image capture device when the functional mode management unit switches to the normal projection mode.

11. A method of managing image display for an image display apparatus, the method comprising the steps of:
   1) communicating with a plurality of information processing apparatuses;
   2) synthesizing a multi-segmented screen image data composed of screen images of the plurality of information processing apparatuses based on image data received from each of the plurality of information processing apparatuses through the communication unit;
   3) projecting the multi-segmented screen image data synthesized by the image synthesizing unit as a multi-segmented screen image onto a screen;
   4) controlling a switching between a normal projection mode and a multi-segmented screen operation mode, wherein an interrupt request from each of the information processing apparatuses is received by the image display apparatus when switched to the normal projection mode;
   5) capturing the multi-segmented screen image displayed on the screen and an image of hand movement of an operator with respect to the multi-segmented screen image when the functional mode management unit switches to the multi-segmented screen operation mode;
   6) detecting a hand movement of the operator with respect to the multi-segmented screen image based on the multi-segmented screen image and the image of hand movement of the operator captured by the capturing, and recognizing a screen image designated as an active-target image in the multi-segmented screen image based on the detected hand movement; and
   7) transmitting a request of image data transmission to an information processing apparatus corresponding to the screen image designated as the active-target image by the designated screen image recognition unit, and not receiving an interrupt request from an information processing apparatus corresponding to a screen image of a non active-target image.

12. The method of claim 11, further comprising the step of setting upper limit numbers of screen images displayable as active-target images in the multi-segmented screen image.

13. The method of claim 11, further comprising the steps of recognizing a screen image designated as a specific operation-target image and a type of hand movement of the operator for the multi-segmented screen image based on the detected hand movement;
   storing types of hand movement of the operator corresponded with specific operation contents applicable for a screen image displayed in the multi-segmented screen image;
   processing the stored specific operation contents corresponding to the recognized type of hand movement of the operator to a screen image designated as a specific operation-target image.

14. The method of claim 13, further comprising the step of rewriting the stored type of hand movement of the operator and specific operation contents.

15. The method of claim 13, further comprising the step of projecting an image corresponding to the recognized type of hand movement of the operator.

16. The method of claim 11, further comprising the steps of requesting a specific information processing apparatus to transmit image data; and changing a display style of a screen image corresponding to the specific information processing apparatus in the multi-segmented screen image to a non-active-target image or a non-display when the specific information processing apparatus transmits a response indicating that transmission of the image data is not possible as a response to the requesting of transmission of the image data.

17. The method of claim 11, further comprising the step of detecting a movement of at least a part of hand of the operator when detecting the hand movement of the operator.

18. The method of claim 11, further comprising the step of shifting the image display apparatus to an energy-save mode to reduce power consumption when a hand movement of the operator is not detected a given time period.

19. The method of claim 11, further comprising the step of stopping power-supply to an image capture device used for capturing the multi-segmented screen image displayed on the screen and the image of hand movement of the operator when the functional mode management unit switches to the normal projection mode.

20. A non-transitory computer-readable storage medium storing a program that, when executed by a computer, causes the computer to execute a method of managing image display for an image display apparatus, the method comprising the steps of:
1) communicating with a plurality of information processing apparatuses;
2) synthesizing a multi-segmented screen image data composed of screen images of the plurality of information processing apparatuses based on image data received from each of the plurality of information processing apparatuses through the communication unit;
3) projecting the multi-segmented screen image data synthesized by the image synthesizing unit as a multi-segmented screen image onto a screen;
4) controlling a switching between a normal projection mode and a multi-segmented screen operation mode, wherein an interrupt request from each of the information processing apparatuses is received by the image display apparatus when switched to the normal projection mode;
5) capturing the multi-segmented screen image displayed on the screen and an image of hand movement of an operator with respect to the multi-segmented screen image when the functional mode management unit switches to the multi-segmented screen operation mode;
6) detecting a hand movement of the operator with respect to the multi-segmented screen image based on the multi-segmented screen image and the image of hand movement of the operator captured by the capturing, and recognizing a screen image designated as an active-target image in the multi-segmented screen image based on the detected hand movement; and
7) transmitting a request of image data transmission to an information processing apparatus corresponding to the screen image designated as the active-target image by the designated screen image recognition unit, and not receiving an interrupt request from an information processing apparatus corresponding to a screen image of a non active-target image.

* * * * *